United States Patent
He et al.

(10) Patent No.: US 10,128,975 B2
(45) Date of Patent: Nov. 13, 2018

(54) IN-BAND NOISE AND/OR SPECTRAL DEFORMATION MEASUREMENT ON POLARIZATION-MULTIPLEXED SIGNALS

(71) Applicant: EXFO INC., Quebec (CA)

(72) Inventors: Gang He, Quebec (CA); Daniel Gariepy, Quebec (CA)

(73) Assignee: EXFO Inc., Quebec (CA)

( * ) Notice: Subject to any disclaimer, the term of this patent is extended or adjusted under 35 U.S.C. 154(b) by 78 days.

(21) Appl. No.: 14/931,983

(22) Filed: Nov. 4, 2015

(65) Prior Publication Data
US 2016/0127074 A1     May 5, 2016

Related U.S. Application Data

(60) Provisional application No. 62/075,520, filed on Nov. 5, 2014, provisional application No. 62/166,441, filed on May 26, 2015.

(51) Int. Cl.
*H04J 14/06* (2006.01)
*H04B 10/079* (2013.01)
*H04B 10/077* (2013.01)

(52) U.S. Cl.
CPC .......... *H04J 14/06* (2013.01); *H04B 10/0775* (2013.01); *H04B 10/07953* (2013.01)

(58) Field of Classification Search
CPC .................. H04B 10/0795; H04J 14/06
See application file for complete search history.

(56) References Cited

U.S. PATENT DOCUMENTS

| | | | |
|---|---|---|---|
| 6,636,306 B2 * | 10/2003 | He | G01J 3/447 356/327 |
| 6,898,001 B2 * | 5/2005 | Ishihara | H04B 10/0731 359/337 |
| 9,008,508 B2 | 4/2015 | Liu | |
| 2003/0072513 A1 | 4/2003 | Glingener et al. | |
| 2004/0247319 A1 | 12/2004 | Melman | |
| 2005/0201757 A1 * | 9/2005 | Bohn | H04B 10/2507 398/149 |

(Continued)

FOREIGN PATENT DOCUMENTS

| | | |
|---|---|---|
| WO | WO2008122123 | 10/2008 |
| WO | WO2011020195 | 2/2011 |

OTHER PUBLICATIONS

Vocondio et al., "On Nonlinear Distortions of Highly Dispersive Optical Coherent Systems", Optics Express, vol. 20, No. 2, pp. 1022-1032 (Jan. 6, 2012).

(Continued)

*Primary Examiner* — Nathan Cors

(57) ABSTRACT

There is provided a method to discriminate NLE-induced signal deformation from ASE-noise on polarization multiplexed signals, in order to measure the OSNR under NLE conditions and/or characterize the NLE-induced signal deformation. In accordance with one aspect, the method is based on the acquisition of optical spectrum traces when the (data-carrying) optical communication signal is partially or completely extinguished (ASE-noise only), as well as with a live optical communication signal. Comparing traces acquired with different conditions and/or at different dates allows discrimination of the signal contribution, the ASE-noise contribution and the NLE-induced deformations on the SUT.

13 Claims, 12 Drawing Sheets

(56) References Cited

U.S. PATENT DOCUMENTS

| | | | |
|---|---|---|---|
| 2012/0155861 A1* | 6/2012 | Liu | H04B 10/0775 398/26 |
| 2012/0201533 A1* | 8/2012 | Gariepy | H04B 10/07953 398/26 |
| 2012/0219285 A1* | 8/2012 | Dahan | H04B 10/07953 398/26 |
| 2013/0028597 A1 | 1/2013 | Ye et al. | |
| 2013/0330071 A1* | 12/2013 | He | H04B 10/07953 398/16 |
| 2014/0086574 A1* | 3/2014 | Gariepy | H04B 10/0795 398/26 |
| 2014/0328586 A1* | 11/2014 | He | H04J 14/06 398/26 |
| 2015/0110486 A1* | 4/2015 | Sunnerud | H04J 14/06 398/26 |
| 2015/0155935 A1* | 6/2015 | Oda | H04B 10/07953 398/26 |
| 2015/0304025 A1* | 10/2015 | Liu | H04B 10/07951 398/28 |
| 2016/0072579 A1* | 3/2016 | Schroeder | H04B 10/07953 398/26 |
| 2016/0142135 A1* | 5/2016 | He | H04B 10/07953 398/26 |
| 2017/0033866 A1* | 2/2017 | Wang | H04B 10/077 |

OTHER PUBLICATIONS

Gariepy et al. "Non-Intrusive Measurement of In-Band OSNR of High Bitrate Polarization-Multiplexed Signals", Opt. Fiber Technol., vol. 17, Issue 5, pp. 518-522 (Oct. 2011).

Lee et al. "OSNR Monitoring Technique Using Polarization-Nulling Method", IEEE Photonics Technology Letters, vol. 13, No. 1, pp. 88-90 (Jan. 2001).

* cited by examiner

IN-BAND NOISE AND/OR SPECTRAL DEFORMATION MEASUREMENT ON POLARIZATION-MULTIPLEXED SIGNALS

CROSS-REFERENCE TO RELATED APPLICATIONS

This application claims priority under 35USC§ 119(e) of U.S. provisional patent application 62/075,520 filed Nov. 5, 2014 and U.S. provisional patent application 62/166,441 filed May 26, 2015; the specification of which is hereby incorporated by reference.

TECHNICAL FIELD

The invention relates to the determination of a quality parameter characterizing an optical communication signal based on the analysis of the power spectral density of the signal. More specifically, the invention relates to the characterization of polarization-multiplexed optical signals propagating in optical fibers.

BACKGROUND OF THE ART

In order to maximize the information content transmitted over a prescribed spectral bandwidth, polarization multiplexing (also known as "dual-polarization") is being increasingly used with new transmission formats. The underlying idea is that the spectral density (conveniently measured in units of bits/Hz) can be effectively doubled by employing two orthogonally polarized data-carrying signal components sharing the same optical signal bandwidth. Normally, these two orthogonally polarized components are transmitted with approximately the same intensity, rendering the total resultant light effectively unpolarized as seen from a test and measurement instrument having an electronic detection bandwidth significantly lower than the symbol rate of the polarization-multiplexed signal, such as is normally the case with Optical Spectrum Analyzers (OSA).

The Optical Signal-to-Noise Ratio (OSNR) is a conventional measurable characteristic of the quality of a signal carried by an optical telecommunication link. Under normal and proper operating conditions, the OSNR of an optical communication link is typically high, often in excess of 15 dB or 20 dB, or even greater. The dominant component of the noise in an optical communication link is typically unpolarized Amplified Spontaneous Emission (ASE) noise, which is a spectrally broadband noise source contributed by the optical amplifiers in the link.

A method of measuring the noise level on polarization-multiplexed signals using an acquired optical spectrum trace of the signal was proposed by Gariepy et al. (see US Patent Application Publication US 2012/0201533 A1, commonly owned by the Applicant and hereby incorporated by reference). This method is based on the knowledge of the spectral shape of the data-carrying signal contribution provided by a reference signal. Based on this knowledge, the data-carrying signal contribution and the ASE-noise contribution that otherwise appear as merged together on the optical spectrum trace, may be mathematically discriminated from one another. Knowledge of the spectral shape of the signal contribution may derive from acquisition of a reference signal taken, for example, at a different point, generally upstream, along the same optical communication link (i.e. the reference signal originates from the same optical transmitter), where the OSNR is known or where the signal can be considered free of ASE noise. This method assumes that, within the optical signal bandwidth, the spectral shape of the signal does not significantly change along the communication link. The signal contribution of such a reference signal is therefore spectrally representative of the signal contribution of the signal-under-test.

However, spectral deformations mostly induced by Non-Linear Effects (NLE) have become more frequent in the case of new deployments using polarization multiplexing, because optimum performance in Bit Error Rate (BER) is obtained by increasing the power propagating within the optical fiber to such an extent that non-linear effects can no longer be neglected. The method proposed by Gariepy et al (loc cit) is impacted by signals subjected to NLE-induced spectral deformations. Consequently, overall system performance in terms of BER is not only affected by the ASE-noise level but also from such non-linear effects (see Vacondio et al, "On nonlinear distorsions of highly dispersive optical coherent systems", Optics Express, Vol. 20, No. 2, pp. 1022-1032 (2012)). Signal quality therefore cannot be assessed based only on the conventionally measured ASE noise level because proper performance indicators should also account for NLE-induced distortions.

A method of measuring the noise level on polarization-multiplexed signals in presence of NLE-induced signal deformation was proposed by Gariepy et al. (see US Patent Application Publication US 2014/0328586 A1, commonly owned by the Applicant and hereby incorporated by reference). The method is based on an analysis of the power spectral density of the Signal-Under-Test (SUT) and is predicated upon knowledge of the spectral shape of the signal in the absence of significant noise or spectral deformation. Again, this knowledge is provided by a reference optical spectrum trace. Based on this knowledge and under the assumption that ASE noise level is approximately constant in wavelength over a given spectral range (i.e. the ASE noise variation is negligible compared to the signal contribution variation), the spectral deformation of the signal contribution of the SUT may be estimated using a comparison of the spectral variations of the optical spectrum trace of the SUT with that of the reference optical spectrum trace.

However, it has been found that this method has limited performance in some cases of tight filtering caused by optical add/drop multiplexers combined with wide-spectrum optical communication signals such as RZ formats and pulse-shaped signals (i.e. when the optical signal bandwidth of the optical communication signal is wide compared to the bandwidth of the ROADMs). In such cases, add-drop filtering leads to non-negligible spectral deformation of the optical communication signal along the communication link (typically in the "wings" of the signal), which makes it difficult to discriminate ASE noise from NLE-induced spectral deformations.

There is therefore a need for a method to characterize polarization-multiplexed signals subject to NLE-induced and/or add-drop filtering-induced signal deformation.

SUMMARY

There is provided a method to discriminate NLE-induced signal deformation from ASE noise on polarization-multiplexed signals, in order to measure the OSNR under NLE conditions and/or to characterize the NLE-induced signal deformation, which is applicable to tightly filtered optical communication signals propagating in optical fibers.

There is provided a method to discriminate NLE-induced signal deformation from ASE-noise on polarization multiplexed signals, in order to measure the OSNR under NLE conditions and/or characterize the NLE-induced signal deformation. In accordance with one aspect, the method is based on the acquisition of optical spectrum traces when the (data-carrying) optical communication signal is partially or completely extinguished (ASE-noise only), as well as with a live optical communication signal. Comparing traces acquired under different conditions and/or at different dates allows discrimination of the signal contribution, the ASE-noise contribution and the NLE-induced deformations on the SUT.

In accordance with one aspect, the proposed method is based on the acquisition of optical spectrum traces at the time of commissioning of the optical communication link under test. In one embodiment, commissioning reference traces are acquired at both the receiver end (or any other test point where the ASE noise and/or the NLE-induced deformation is to be assessed) and the transmitter end, whereas in another embodiment, commissioning reference traces are acquired at the receiver end only (or the test point above). Comparing commissioning traces to traces acquired at some later date on the SUT at the receiver end allows discrimination of the signal contribution, the ASE-noise contribution and the NLE-induced deformations on the SUT.

Some embodiments in which commissioning reference traces are acquired only at the receiver end may provide a measurement of the evolution in time of the NLE-induced signal deformation (to indicate whether the NLEs have changed over time, the initial NLE conditions being unknown) and measurement of the ASE noise.

Embodiments in which commissioning reference traces are acquired both at the transmitter and the receiver end may provide, to within reasonable measurement uncertainties, a measurement of the absolute NLE-induced signal deformation in addition to a measurement of the absolute ASE-noise (by opposition to relative measurements, i.e. the evolution in time).

Some embodiments of the proposed method provide an "all-in-one" (and correlated) solution for commissioning, maintenance, monitoring, and troubleshooting of an optical communication link.

Therefore, in accordance with one aspect, there is provided a method for characterizing an optical signal-under-test (SUT) resulting from the propagation of a polarization-multiplexed optical signal on an optical communication link, the SUT comprising at least a data-carrying signal contribution and an Amplified Spontaneous Emission (ASE) noise contribution within an optical signal bandwidth. At a test point on said optical communication link and at a first time, while the polarization-multiplexed optical signal on said optical communication link is live within said optical signal bandwidth, a first commissioning optical spectrum trace $P_{Rx\_t1\_L}(\lambda)$ of said polarization-multiplexed optical signal is acquired, said first optical spectrum trace extending over a spectral range encompassing at least a portion of said optical signal bandwidth. At said test point on said optical communication link and at a second time, a test optical spectrum trace $P_{SUT}(\lambda)$ of said SUT is acquired, said test optical spectrum trace extending over a spectral range encompassing at least said portion of said optical signal bandwidth. From at least acquired test optical spectrum trace $P_{SUT}(\lambda)$ and first commissioning optical spectrum trace $P_{Rx\_t1\_L}(\lambda)$, there is estimated, within said spectral range, at least one of said ASE-noise contribution, a variation $\Delta N_{ASE}$ of the ASE-noise contribution between said optical signal at said first time and said signal-under-test at said second time and/or a relative signal deformation $\Delta k_{NL}(\lambda)$ of the data-carrying signal contribution between said optical signal at said first time and said signal-under-test at said second time.

In accordance with another aspect, there is provided a non-transitory computer readable storage medium having stored thereon computer-readable instructions that, when executed by a computer, cause the computer to perform a method for characterizing an optical signal-under-test (SUT) resulting from the propagation of a polarization-multiplexed optical signal on an optical communication link, the SUT comprising at least a data-carrying signal contribution and an Amplified Spontaneous Emission (ASE) noise contribution within an optical signal bandwidth. The method comprises: i) obtaining a first commissioning optical spectrum trace $P_{Rx\_t1\_L}(\lambda)$, acquired at a test point on said optical communication link and at a first time, wherein said first commissioning optical spectrum trace $P_{Rx\_t1\_L}(\lambda)$ is acquired while the polarization-multiplexed optical signal is live on said optical communication link within said optical signal bandwidth, and extends over a spectral range encompassing at least a portion of said optical signal bandwidth; ii) obtaining a test optical spectrum trace $P_{SUT}(\lambda)$ of said SUT acquired at said test point on said optical communication link and at a second time, wherein said test optical spectrum trace extends over a spectral range encompassing at least said portion of said optical signal bandwidth; and iii) at least from acquired test optical spectrum trace $P_{SUT}(\lambda)$ and first commissioning optical spectrum trace $P_{Rx\_t1\_L}(\lambda)$, estimating, within said spectral range, at least one of said ASE-noise contribution, a variation $\Delta N_{ASE}$ of the ASE-noise contribution between said optical signal at said first time and said signal-under-test at said second time and a relative signal deformation $\Delta k_{NL}(\lambda)$ of the data-carrying signal contribution between said optical signal at said first time and said signal-under-test at said second time.

In accordance with another aspect, there is provided a method for monitoring an optical signal-under-test (SUT) resulting from the propagation of a polarization-multiplexed optical signal on an optical communication link. At a test point on said optical communication link and at a first time, while the polarization-multiplexed optical signal on said optical communication link is live within said optical signal bandwidth, a first commissioning optical spectrum trace $P_{Rx\_t1\_L}(\lambda)$ of said polarization-multiplexed optical signal is acquired, said first optical spectrum trace extending over a spectral range encompassing at least a portion of said optical signal bandwidth, the polarization-multiplexed optical signal comprising at least a data-carrying signal contribution and an Amplified Spontaneous Emission (ASE) noise contribution within an optical signal bandwidth. At said test point on said optical communication link and at a second time, a test optical spectrum trace $P_{SUT}(\lambda)$ of said SUT is acquired, said test optical spectrum trace extending over a spectral range encompassing at least said portion of said optical signal bandwidth, said SUT comprising at least a data-carrying signal contribution and an ASE-noise contribution within an optical signal bandwidth. From at least acquired test optical spectrum trace $P_{SUT}(\lambda)$ and first commissioning optical spectrum trace $P_{Rx\_t1\_L}(\lambda)$, a variation $\Delta N_{ASE}$ of the ASE-noise contribution between said optical signal at said first time and said signal-under-test at said second time and/or a relative signal deformation $\Delta k_{NL}(\lambda)$ of the data-carrying signal contribution between said optical signal at said first time and said signal-under-test at said second time is estimated within said spectral range.

Furthermore, if the signal deformation $k_F(\lambda)$ induced by add-drop filtering on the SUT between the transmitter end and the receiver end is known or has been previously characterized, e.g., at commissioning, then, at any later date, either or both the ASE noise and the NLE induced signal deformation $k_{NL\_SUT}(\lambda)$ on the SUT may be determined using live optical spectrum traces acquired at both the transmitter and the receiver ends.

Therefore, in accordance with another aspect, there is provided a method for characterizing an optical signal-under-test (SUT) resulting from the propagation of a polarization-multiplexed optical signal on an optical communication link, the SUT comprising at least a data-carrying signal contribution and an Amplified Spontaneous Emission (ASE) noise contribution within an optical signal bandwidth. At a source point along said optical communication link, while the polarization-multiplexed optical signal on said optical communication link is live on said optical communication link within said optical signal bandwidth, a first optical spectrum trace $P_{Tx\_t\_L}(\lambda)$ is acquired, said first optical spectrum trace extending over a spectral range encompassing at least a portion of said optical signal bandwidth. At a test point downstream from said source point on said optical communication link, a test optical spectrum trace $P_{SUT}(\lambda)$ of said SUT is acquired, said test optical spectrum trace extending over a spectral range encompassing at least said portion of said optical signal bandwidth. At least one of said ASE-noise contribution and a signal deformation $k_{NL\_SUT}(\lambda)$ induced by non-linear effects on said SUT between said source point and said test point at said second time is estimated within said spectral range, using at least said first optical spectrum trace $P_{Tx\_t\_L}(\lambda)$, said test optical spectrum trace $P_{SUT}(\lambda)$ and an estimation of a filtering-induced signal deformation $k_F(\lambda)$ on said SUT between said source point and said test point.

In accordance with one embodiment, at said source point on said optical communication link and at said first time, a first commissioning optical spectrum trace $P_{Tx\_t1\_PE}(\lambda)$ is acquired while the polarization-multiplexed optical signal is partially extinguished on said optical communication link within said optical signal bandwidth, said first commissioning optical spectrum trace extending over a spectral range encompassing at least a portion of said optical signal bandwidth; at said test point on said optical communication link and at said first time, a second commissioning optical spectrum trace $P_{Rx\_t1\_PE}(\lambda)$ is acquired while the polarization-multiplexed optical signal on said optical communication link is partially extinguished within said optical signal bandwidth, said second commissioning optical spectrum trace extending over a spectral range encompassing at least said portion of said optical signal bandwidth; and said filtering-induced signal deformation $k_F(\lambda)$ on said SUT between said source point and said test point is estimated by comparing said second commissioning optical spectrum trace $P_{Rx\_t1\_PE}(\lambda)$ with said first commissioning optical spectrum trace $P_{Tx\_t1\_PE}(\lambda)$.

The spectral deformation $k_{NL\_SUT}(\lambda)$ may be estimated by: estimating a first spectral shape trace $S_{Tx\_t}(\lambda)$ of said data-carrying polarization-multiplexed optical signal at said first time and at said source point, within said spectral range, at least from said first optical spectrum trace $P_{Tx\_t\_L}(\lambda)$; calculating a reference spectral shape trace $S_{Ref}(\lambda)$ within said spectral range by multiplying said first spectral shape trace $S_{Tx\_t}(\lambda)$ with said filtering-induced signal deformation $k_F(\lambda)$; and discriminating said signal deformation $k_{NL\_SUT}(\lambda)$ from said ASE-noise contribution $N_{ASE\_SUT}$ and said data-carrying signal contribution $S_{SUT}(\lambda)$ on said test optical spectrum trace $PSUT(\lambda)$ using said reference spectral shape trace $S_{Ref}(\lambda)$.

Moreover, in accordance with further aspect, no commissioning acquisitions are required. In this case, at any time t where an SUT is to be characterized, two optical spectrum traces are acquired at the receiver end, one with a partially-extinguished, i.e. low-power, optical communication signal and one with full (i.e. "normal") live signal power (i.e. the SUT). These two traces allow for characterization of the ASE noise on the SUT and, assuming that the partially-extinguished optical communication signal suffers from no or negligible NLE-induced deformation, these same two traces also allow for characterization of the NLE-induced deformation $k_{NL\_SUT}(\lambda)$.

Therefore, in accordance with a further aspect, there is provided a method for characterizing an optical signal-under-test (SUT) resulting from the propagation of a polarization-multiplexed optical signal on an optical communication link, the SUT comprising at least a data-carrying signal contribution and an Amplified Spontaneous Emission (ASE) noise contribution within an optical signal bandwidth. At a test point on said optical communication link, while the polarization-multiplexed optical signal on said optical communication link is partially extinguished within said optical signal bandwidth, a low-power optical spectrum trace $P_{Rx\_PE}(\lambda)$ is acquired, said low-power optical spectrum trace extending over a spectral range encompassing at least a portion of said optical signal bandwidth. Still at a test point on said optical communication link, a test optical spectrum trace $P_{SUT}(\lambda)$ of said SUT is acquired, said test optical spectrum trace extending over a spectral range encompassing at least said portion of said optical signal bandwidth. At least from acquired test optical spectrum trace $P_{SUT}(\lambda)$ and low-power optical spectrum trace $P_{Rx\_PE}(\lambda)$, at least one of said ASE-noise contribution and a signal deformation $k_{NL\_SUT}(\lambda)$ induced by Non-Linear Effects (NLEs) on said data-carrying signal contribution of said SUT is estimated within said spectral range.

In accordance with one embodiment, a reference spectral shape trace $S_{ref}(\lambda)$ of said data-carrying signal contribution of at least one of the SUT and the low-power optical spectrum trace is estimated using said low-power optical spectrum trace $P_{Rx\_PE}(\lambda)$ and said test optical spectrum trace $P_{SUT}(\lambda_1)$); and said at least one of said ASE-noise contribution and a signal deformation $k_{NL\_SUT}(\lambda)$ induced by Non-Linear Effects (NLEs) on said SUT is estimated by discriminating said ASE-noise contribution $N_{ASE\_SUT}$ from said data-carrying signal contribution $S_{SUT}(\lambda)$ on at least one of the test optical spectrum trace $P_{SUT}(\lambda)$ and the low-power optical spectrum trace using said reference spectral shape trace $S_{ref}(\lambda)$.

In accordance with a further embodiment, said reference spectral shape trace $S_{ref}(\lambda)$ is estimated by mutually-subtracting said low-power optical spectrum trace $P_{Rx\_PE}(\lambda)$ and said test optical spectrum trace $P_{SUT}(\lambda)$.

The signal deformation $k_{NL\_SUT}(\lambda)$ induced by non-linear effects on said SUT may be estimated and is representative of the absolute NLE-induced signal deformation $k_{NL\_SUT}(\lambda)$ on said SUT by propagation along said optical communication link between a source point of the polarization-multiplexed optical signal and said test point.

A partial extinction of said optical signal may be obtained using an attenuation device inserted along said optical communication link close to a transmitter at the origin of said SUT.

An NLE-induced signal deformation factor characterizing said SUT may be determined from said signal deformation $k_{NL\_SUT}(\lambda)$ induced by NLE on said data-carrying signal contribution of said SUT.

In accordance with another aspect, there is provided a test system for characterizing an optical signal-under-test (SUT) resulting from the propagation of a polarization-multiplexed optical signal on an optical communication link, the SUT comprising at least a data-carrying signal contribution and an Amplified Spontaneous Emission (ASE) noise contribution within an optical signal bandwidth. The test system comprises:

an attenuation device to be connected at a source point of the polarization-multiplexed optical signal on said optical communication link to temporarily and partially extinguish said polarization-multiplexed optical signal;

an optical spectrum analyzer device to be connected at a test point on said optical communication link to:

acquire a test optical spectrum trace $P_{SUT}(\lambda)$ of said SUT, said test optical spectrum trace extending over a spectral range encompassing at least a portion of said optical signal bandwidth; and while the polarization-multiplexed optical signal on said optical communication link is partially extinguished using said attenuation device, acquire a low-power optical spectrum trace $P_{Rx\_PE}(\lambda)$, said first optical spectrum trace extending over a spectral range encompassing at least said portion of said optical signal bandwidth; and a processing module configured to estimate at least one of said ASE-noise contribution and a signal deformation $k_{NL\_SUT}(\lambda)$ induced by Non-Linear Effects (NLEs) on said SUT, within said spectral range, at least from acquired test optical spectrum trace $P_{SUT}(\lambda)$ and low-power optical spectrum trace $P_{Rx\_PE}(\lambda)$.

In this specification, for ease of understanding and notation, reference is often made to the "receiver end" (Rx-side) of the optical communication link as the location along the link where the SUT is being measured and characterized. However, it should be understood that the SUT may be measured and assessed at any location along the optical communication link (e.g., obtained via a monitoring port) and that, in this specification, any reference to the "receiver end" can be replaced by any "test point" along the optical communication link.

In this specification, for ease of understanding and notation, reference is often made to the "transmitter end" (Tx-side) of the optical communication link as the location along the link that is "upstream" from the test point and where the measured signal (e.g., accessed via a monitoring port) may be used as a reference such that any filtering-induced and NLE-induced signal deformations on the SUT will be assessed in a differential manner relative to this "source point". In order for the assessed filtering-induced signal deformations to be considered absolute (as opposed to a differential value between two points), this "source point" should be located along said optical communication link between a transmitter at the origin of the SUT and any spectral-filtering component along the optical communication link. In addition, in order for the assessed NLE-induced signal deformations to be considered absolute, this "source point" should be located along said optical communication link sufficiently close to the transmitter in order that the optical communication signal will not have suffered from any significant NLE. It will be understood that, in this specification, any reference to the "transmitter end" can be replaced by any "source point" along the optical communication link.

In this specification, the expression "trace" is not to be construed limitatively to data that are displayed graphically, but is intended to encompass data which are not displayed graphically but nonetheless used for any suitable purpose. An "optical spectrum trace" refers to the spectrally-resolved optical power or the spectrally-resolved amplitude of the electric-field of a signal as obtained by acquisition using an Optical Spectrum Analyzer (OSA) for example, or obtained from any appropriate recorded data or numerically generated data.

In this specification, the expression "optical signal bandwidth" is meant to refer to the spectral width of an optical communication signal as defined nominally by its symbol rate and modulation type (e.g. RZ versus NRZ, etc.) and potentially narrowed down by optical filtering underwent by the signal along an optical link due to, e.g., add-drop filtering.

In this specification, unless otherwise mentioned, word modifiers such as "substantially" and "about" which modify a condition or relationship characteristic of a feature or features of an embodiment, should be understood to mean that the condition or characteristic is defined to within tolerances that are acceptable for proper operation of that embodiment in the context of an application for which it is intended.

BRIEF DESCRIPTION OF THE DRAWINGS

Further features and exemplary advantages of the present invention will become apparent to the skilled person from the following detailed description, taken in conjunction with the appended drawings, in which.

It will be noted that throughout the appended drawings, like features are identified by like reference numerals.

In the appended flow charts, boxes shown in dashed lines are used to denote steps or features that may be optional in some circumstances or for some embodiments.

It should also be understood that when the appended drawings are denoted as schematics, elements of the drawings are not necessarily drawn to scale. Some mechanical or other physical components may also be omitted in order to not unduly encumber the figures.

DESCRIPTION

Figure 1:
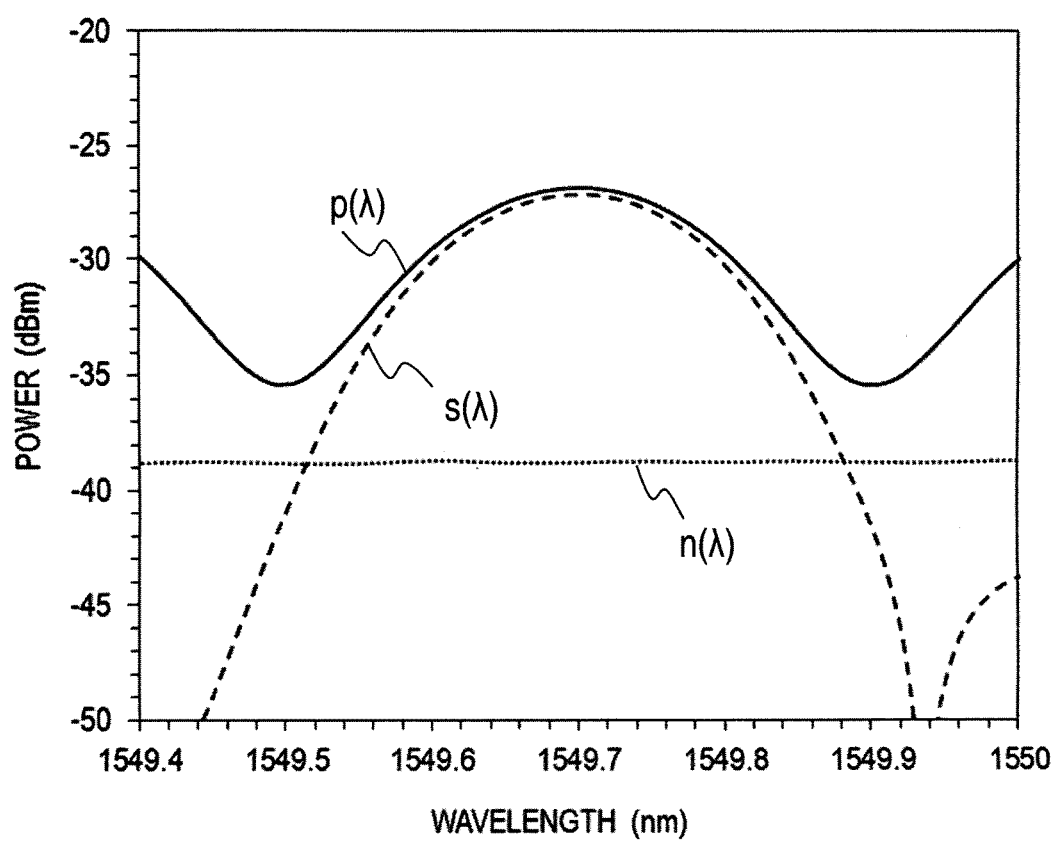
FIG. 1 is a graph illustrating the optical spectrum of an exemplary optical signal-under-test along with the optical spectrum of its noise contribution and of its signal contribution.

Now referring to FIG. 1, the methods and systems described herein relate to the characterization of an optical Signal-Under-Test (SUT) p which is used in optical telecommunications to transmit data over a Dense Wavelength Division Multiplexing (DWDM) optical channel. Throughout the present description, the optical signal p corresponds to one of the DWDM optical channels. Within the optical channel bandwidth of interest, the optical signal p includes two components, namely a signal contribution s arising from the data-carrying signal, and an ASE-noise contribution $n_{ASE}$ which includes all other sources of optical power within the optical channel. In the case of polarization-multiplexed communication, the signal contribution includes two distinct components having mutually orthogonal states of polarization. The noise contribution n arises mostly from the Amplified Spontaneous Emission (ASE) noise of the optical amplifiers in the optical transmission system. FIG. 1 shows the optical spectrum $p(\lambda)$ of an exemplary optical signal p, along with the optical spectrum of its data-carrying signal contribution $s(\lambda)$ and the optical spectrum of its ASE-noise contribution $n_{ASE}(\lambda)$, such that:

$$p(\lambda)=s(\lambda)+n_{ASE}(\lambda) \quad (1)$$

An optical spectrum trace of the optical signal p can be acquired by an Optical Spectrum Analyzer (OSA) and represents the input optical signal p convolved with the filter spectral response of the OSA $h_{OSA}(\lambda)$. The optical spectrum trace $P(\lambda)$ thus represents the spectrally-resolved optical power of the optical signal p. The optical spectrum trace $P(\lambda)$ also includes a data-carrying signal contribution $S(\lambda)$ and a noise contribution $N_{ASE}(\lambda)$, which are merged together and appear as the optical spectrum trace $P(\lambda)$.

The methods and systems described herein are used to discriminate the signal contribution $S(\lambda)$ from the ASE-noise contribution $N_{ASE}(\lambda)$ in the optical spectrum trace $P(\lambda)$ of the SUT in order to evaluate quality parameters of the SUT denoting, for example, spectral deformations of the signal contribution $s(\lambda)$ of the SUT occurred during transmission. The instrumental noise associated with the detection system itself, namely the OSA, on the acquired optical spectrum trace $P(\lambda)$ is considered to have a negligible effect on the optical parameters to be characterized.

One or more quality parameters characterizing the polarization-multiplexed SUT, such as the NLE-induced-signal-deformation-equivalent Optical Signal-to-Noise Ratio ($OSNR_{SD}$), the ASE-only Optical Signal-to-Noise Ratio ($OSNR_{ASE}$) or the Signal Deformation Factor (SDF) (defined hereinbelow), may be determined once the NLE-induced spectral deformation of the signal contribution and/or the ASE-noise contribution, have been estimated.

FIG. 1 illustrates a single DWDM channel, but it should be noted that when wavelength division multiplexing is employed, multiple DWDM channels (not shown) appear on the optical communication spectrum. It should thus be kept in mind that other optical signals are typically present, distributed spectrally on both sides of the optical signal p. Also, in the case of polarization-multiplexed networks, each DWDM channel includes orthogonally polarized signals which, on an optical spectrum trace $P(\lambda)$ acquired by an OSA, will appear combined and undistinguishable as a single unpolarized signal.

Some methods described herein for characterizing an optical SUT are based on the acquisition of optical spectrum traces at the time of commissioning of the optical communication link under test. In order not to unduly encumber the description, reference will be simply made to the time of commissioning, although it will be understood that the prior traces may be acquired at any other date prior to the acquisition of the SUT. Commissioning optical spectrum traces may be acquired when the (data-carrying) optical communication signal is extinguished (ASE-noise only) or partially-extinguished (low-power), as well as with a live optical communication signal. Comparing commissioning traces to traces acquired at some later date on the SUT at the receiver end allows discrimination of both the signal contribution and the ASE-noise contribution, as well as characterization of the NLE-induced deformations on the SUT.

Figure 2:
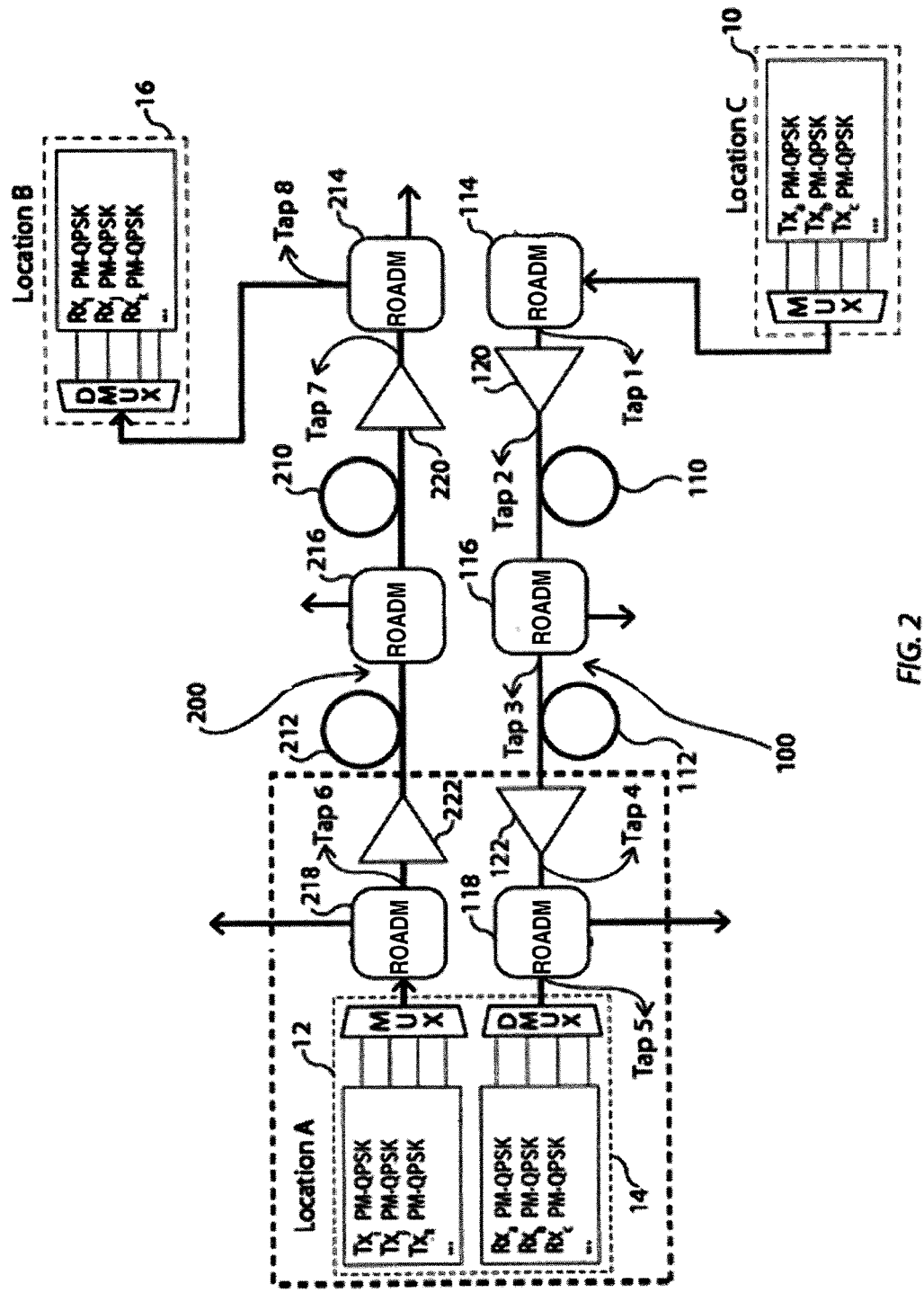
FIG. 2 is a schematic illustrating an example generic network scheme wherein an optical signal-under-test may be characterized using the methods described herein.

FIG. 2 shows an example of a generic network scheme wherein an optical SUT may be characterized using the methods described herein. The network scheme of FIG. 2 is provided to illustrate applications of the methods described hereinbelow. Of course, it will be understood that the methods described herein are not limited to bi-directional optical communication links as shown in FIG. 2. It should also be understood that such methods may also be applicable to other network schemes or in unrelated contexts. The illustrative network of FIG. 2 employs a Polarization-Multiplexed Quadrature Phase-Shift Keying (PM-QPSK) modulation scheme to transmit data at a nominal "payload" bit rate of, e.g., 40 Gbit/s or 100 Gbit/s (often denoted more simply as 40 G and 100 G) and comprises a plurality of PM-QPSK transmitters 10, 12 and PM-QPSK receivers 14, 16 connected together through the network in order to transmit data between a plurality of nodes disposed at a respective plurality of distinct locations A, B, C. The network, shown in FIG. 2, includes a first optical communication link 100 between transmitter 10 at location C and receiver 14 at location A, and a second optical communication link 200 between transmitter 12 at location A and receiver 16 at location B. Communication link 100 comprises optical fibers 110, 112, a plurality of optical add-drop filters 114, 116, 118 such as Reconfigurable Optical Add-Drop Multiplexers (ROADMs) and a plurality of optical amplifiers 120, 122 distributed along the communication link. Similarly, communication link 200 comprises optical fibers 210, 212, a plurality of optical add/drop multiplexers 214, 216, 218, such as ROADMs, and a plurality of optical amplifiers 220, 222 distributed along the communication link. Monitoring tap ports (e.g. the 5% port of a 95/5 splitter), which are commonly available on network systems, are disposed along communication link 100 (Tap 1, Tap 2, Tap 3, Tap 4, Tap 5) and along communication link 200 (Tap 6, Tap 7, Tap 8,) to monitor the optical signals as they propagate along the communication link, using the methods described herein.

Some methods described herein provide for the determination of quality parameters characterizing a SUT measured anywhere along e.g. the communication links 100 and 200, in conjunction with previously-acquired commissioning optical spectrum traces. For example, the SUT to be characterized may be the optical signal as may be acquired at Tap 2, Tap 3, Tap 4, Tap 5, Tap7 or Tap 8.

The optical spectrum trace of the SUT is generally obtained with a measurement instrument capable of discriminating optical frequencies encompassed within the optical bandwidth of the SUT. Such measurements are typically acquired using a standard grating-based OSA such as, e.g., that described in U.S. Pat. No. 6,636,306 to He et al. (commonly owned by the Applicant), or that commercially available as the FTB-5240 series of OSAs manufactured and sold by EXFO Inc. Alternatively, the methods described herein may also be implemented with a heterodyne OSA or a Fourier Transform OSA (FFT OSA) for instance, or any other suitable means for obtaining the optical spectrum traces. As mentioned hereinabove, in this specification, an "optical spectrum trace" refers to the spectrally-resolved optical power or spectrally-resolved amplitude of the electric-field of a signal as obtained by acquisition using an OSA or obtained from any appropriate recorded data or numerically generated data.

Optical spectrum traces acquired on a SUT at any two locations along an optical communication link (e.g. acquired at monitoring ports near the transmitter end and the receiver end) may be expressed as:

$$P_1(\lambda) = S_1(\lambda) + N_{ASE1}(\lambda) \tag{2.1a}$$

$$P_2(\lambda) = S_2(\lambda) + N_{ASE2}(\lambda) \tag{2.1b}$$

where $S_1(\lambda)$ and $S_2(\lambda)$ represent the data-carrying signal contributions to the optical spectrum trace acquired at locations 1 and 2 respectively, and where $N_{ASE1}(\lambda)$ and $N_{ASE2}(\lambda)$ represent the ASE-noise contributions to the optical spectrum trace acquired at locations 1 and 2 respectively. In one embodiment, location 1 corresponds to the transmitter end and location 2 to the receiver end but it will be understood that the following may be generalized to any two distinct locations wherein location 1 (also referred to herein as the "source point") is "upstream" from location 2 (also referred to herein as the "test point"), e.g., for characterization of the relative change in noise and spectral deformation between the two points along the optical communication link.

In presence of NLE-induced and add-drop filtering-induced signal deformation, the signal contribution $S_2(\lambda)$ at location 2 presents a spectral deformation when compared to the signal contribution $S_1(\lambda)$ at location 1, which may be expressed as a spectral deformation function $k(\lambda)$:

$$S_2(\lambda) = k(\lambda) \cdot S_1(\lambda) \tag{2.2a}$$

$$k(\lambda) = k_0 \cdot k_{NL}(\lambda) \cdot k_F(\lambda) \tag{2.2b}$$

where $k(\lambda)$ is the spectral deformation function between locations 1 and 2. The spectral deformation function $k(\lambda)$ may be denoted as per the different origins of the deformation, i.e. the NLE-induced signal deformation function $k_{NL}(\lambda)$ which represents the deformation caused by NLEs on the optical communication signal between location 1 and location 2, the add-drop filtering-induced signal deformation function $k_F(\lambda)$ which represents the deformation caused by optical add-drop filtering affecting the optical communication signal between location 1 and location 2, and a (constant) gain/loss factor $k_0$. It is noted that the add-drop filtering-induced signal deformation function $k_F(\lambda)$ is expected to be substantially stable with time for a given optical communication link (i.e. exhibiting not more than a slight wavelength drift), whereas a variation in the NLE-induced signal deformation function $k_{NL}(\lambda)$ may be present and may then be characterized.

It is noted that some level of interchannel crosstalk may arise within the optical signal bandwidth of the SUT but such interchannel crosstalk will typically be negligible within the spectral region of interest and can therefore be disregarded. This is even more so in presence of tight filtering caused by optical add/drop multiplexers that may be interposed between the transmitter and the receiver.

Figure 3:
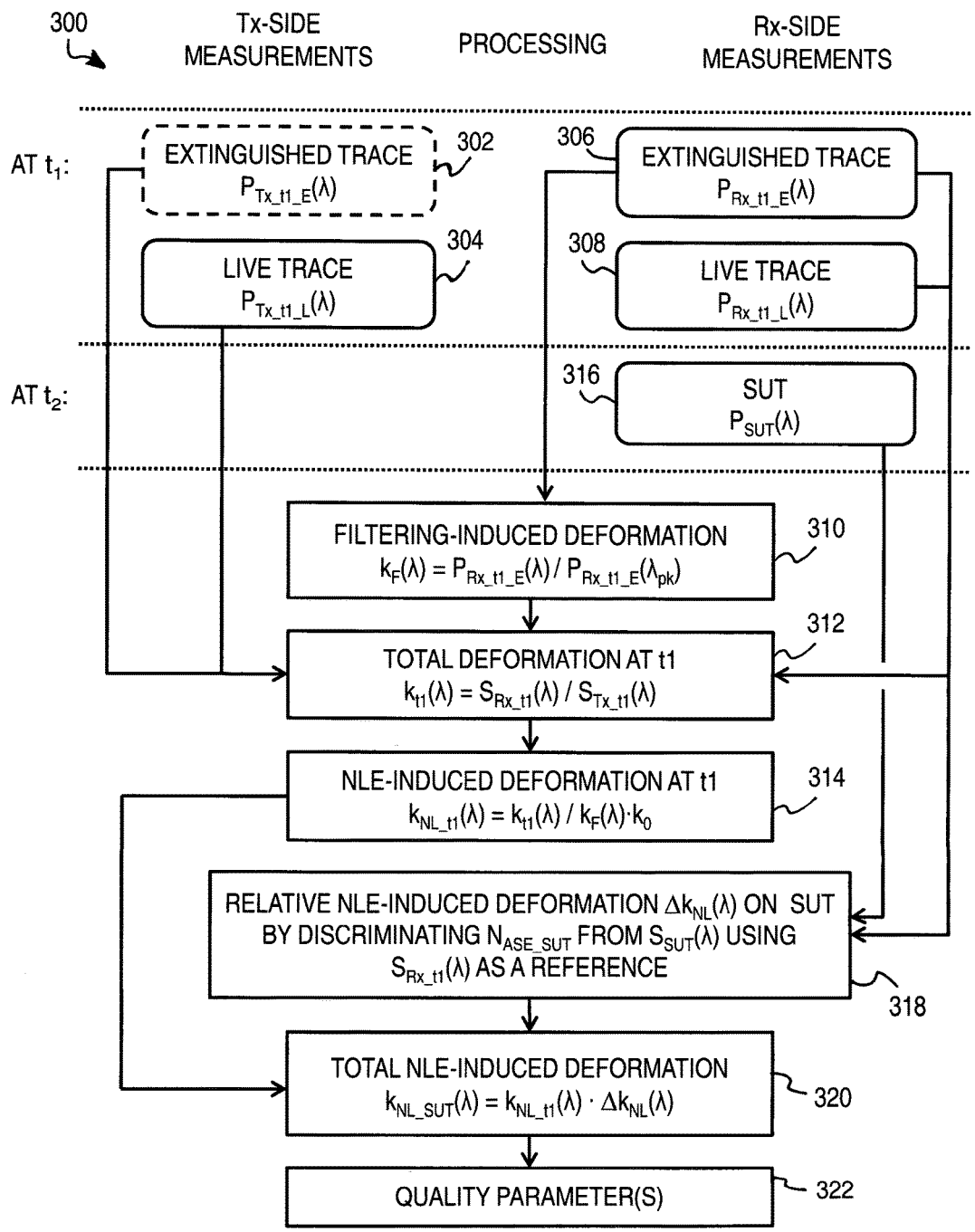
FIG. 3 is a flow chart illustrating a method for characterizing a polarization-multiplexed optical Signal-Under-Test (SUT), wherein extinguished and live signal optical spectrum traces are acquired both at the transmitter end and the receiver end.

Referring to FIG. 3, a first exemplary test method 300 is now described in which commissioning reference traces are acquired both in proximity to the transmitter end (e.g. location A in FIG. 2) and in proximity to the receiver end, or any other location where the ASE noise and/or the NLE-induced deformation is to be assessed (e.g. location B, Y or R in FIG. 2). Again, in this example, reference is made to the transmitter end and the receiver end, but it will be understood that this example may be generalized to any two distinct locations along the optical communication link.

In steps 302, 304, 306 and 308, acquisitions are first conducted at time $t_1$ (more specifically over a time period beginning at time $t_1$ typically extending over a single day). Commissioning optical spectrum traces are acquired close to the transmitter end and the receiver end, both with an extinguished and a live optical communication signal within the considered optical signal bandwidth. More specifically, in step 302, a first commissioning optical spectrum trace $P_{Tx\_t1\_E}(\lambda)$ is acquired at the transmitter end while the optical signal on the communication link is extinguished within the optical signal bandwidth (i.e. the source is turned off, disconnected or blocked). In step 304, a second commissioning optical spectrum trace $P_{Tx\_t1\_L}(\lambda)$ is acquired at the transmitter while the optical signal on the communication link is live within the optical signal bandwidth. In step 306, a third commissioning optical spectrum trace $P_{Rx\_t1\_E}(\lambda)$ is acquired at the receiver end while the optical signal on the communication link is extinguished within the optical signal bandwidth. In step 308, a fourth commissioning optical spectrum trace $P_{Rx\_t1\_L}(\lambda)$ is acquired at the receiver end while the optical signal on the communication link is live within the optical signal bandwidth.

Because the optical communication signal needs to be extinguished to perform these measurements, it may be suitable to conduct these measurements at the time of commissioning the optical communication link (thus the notation "commissioning optical spectrum traces" and "commissioning time"). This avoids the need to disrupt the communication at a later date in order to conduct steps 302, 304, 306 and 308 of the method 300. However, if need be and if suitable for the specific application, these measurements may be conducted at any other later date.

In step 310, the filtering-induced signal deformation between the transmitter end and the receiver end (herein expressed as the filtering-induced signal deformation function $k_F(\lambda)$) is estimated:

It is assumed that the optical spectrum trace $P_{Rx\_t1\_E}(\lambda)$ of the extinguished signal acquired at the receiver ends corresponds to ASE-noise at the commissioning time $t_1$:

$$P_{Rx\_t1\_E}(\lambda)=N_{ASE\_Rx\_t1}(\lambda) \quad (3.1)$$

It will be understood that this assumption normally holds for wavelength-multiplexed optical communication links normally carrying optical communication signals on a large number of channels (e.g. >10 to 16) and for which only one or a small number of channels are extinguished in order to conduct steps 302 and 306.

The add-drop filtering-induced signal deformation function $k_F(\lambda)$ between the transmitter end and the receiver end may be estimated using the spectral shape of the ASE-noise at the receiver end, which may be normalized at the central wavelength $\lambda_{pk}$ of the optical communication signal $\lambda_{pk}$:

$$k_F(\lambda)=N_{ASE\_Rx\_t1}(\lambda)/N_{ASE\_Rx\_t1}(\lambda_{pk})=P_{Rx\_t1\_E}(\lambda)/P_{Rx\_t1\_E}(\lambda_{pk}) \quad (3.2a)$$

In one embodiment, this estimation of the add-drop filtering-induced signal deformation function $k_F(\lambda)$ may optionally be improved for the case of cascaded add-drop filters interposed between the transmitter and receiver by removing from the ASE-noise at the receiver end $N_{ASE\_Rx\_t1}(\lambda)$ any residual ASE-noise $N_{ASE\_res}$ added to the optical communication signal after being subjected to the last add-drop filtering. By again optionally normalizing at the central wavelength $\lambda_{pk}$, we obtain:

$$k_F(\lambda)=(P_{Rx\_t1\_E}(\lambda)-N_{ASE\_res})/(P_{Rx\_t1\_E}(\lambda_{pk})-N_{ASE\_res}) \quad (3.2b)$$

where $N_{ASE\_res}$ may be estimated from the ASE-noise level measured far from the central wavelength $\lambda_{pk}$, i.e. at the very limits of the optical signal bandwidth. Of course, additional improvements to the estimation of the add-drop filtering-induced signal deformation function $k_F(\lambda)$ may be employed as the practical conditions may fit.

In step 312, the total signal deformation of the data-carrying signal contribution between the transmitter end and the receiver end at the commissioning time $t_1$ is estimated (herein expressed as the total signal deformation function $k_{t1}(\lambda)$):

With a live signal, the optical spectrum traces respectively acquired at the transmitter end $P_{Tx\_t1\_L}(\lambda)$ and at the receiver end $P_{Rx\_t1\_L}(\lambda)$ end both contain a signal contribution $S_{Tx\_t1}(\lambda)$, $S_{Rx\_t1}(\lambda)$ and an ASE-noise contribution, the latter being assumed to be equivalent to that measured with the extinguished signal, i.e. $N_{ASE\_Tx\_t1}(\lambda)$, $N_{ASE\_Rx\_t1}(\lambda)$. The signal contributions can be retrieved therefrom as follows:

$$S_{Tx\_t1}(\lambda)=P_{Tx\_t1\_L}(\lambda)-N_{ASE\_Tx\_t1}(\lambda)=P_{Tx\_t1\_L}(\lambda)-P_{Tx\_t1\_E}(\lambda) \quad (3.3a)$$

$$S_{Rx\_t1}(\lambda)=P_{Rx\_t1\_L}(\lambda)-N_{ASE\_Rx\_t1}(\lambda)=P_{Rx\_t1\_L}(\lambda)-P_{Rx\_t1\_E}(\lambda) \quad (3.3b)$$

It is noted that, in the specific case for which it is known that there is no significant ASE-noise on the live-signal commissioning optical spectrum trace $P_{Tx\_t1\_L}(\lambda)$ acquired at the transmitter side, the acquisition of extinguished commissioning optical spectrum trace $P_{Tx\_t1\_E}(\lambda)$ (step 302) may be omitted and the signal contribution $S_{Tx\_t1}(\lambda)$ be found directly from the live-signal measurement $P_{Tx\_t1\_L}(\lambda)=S_{Tx\_t1}(\lambda)$.

The total signal deformation function $k_{t1}(\lambda)$ may then be found by comparing the spectral shape trace $S_{Tx\_t1}(\lambda)$ with the spectral shape trace $S_{Rx\_t1}(\lambda)$, i.e. in this example, by calculating a ratio of the two traces:

$$k_{t1}(\lambda)=S_{Rx\_t1}(\lambda)/S_{Tx\_t1}(\lambda) \quad (3.4)$$

In step 314, the NLE-induced signal deformation function $k_{NL\_t1}(\lambda)$ at commissioning time may also be evaluated:

$$k_{NL\_t1}(\lambda)=k_{t1}(\lambda)/(k_F(\lambda)\cdot k_0) \quad (3.5)$$

where $k_F(\lambda)$ is determined in step 312 and where $k_0$ is selected such that, e.g., $k_0=S_{Rx\_t1}(\lambda_{pk})/S_{Tx\_t1}(\lambda_{pk})$ and where $\lambda_{pk}$ is the central wavelength of the optical communication signal.

The NLE-induced signal deformation function $k_{NL\_t1}(\lambda)$ at commissioning and the add-drop filtering-induced signal deformation function $k_F(\lambda)$ may be recorded for later use.

Then, at any other time $t_2$ after commissioning ($t_2 \neq t_1$), i.e. on any other day after commissioning, and typically when the optical communication link is active and in normal use, the optical communication signal at the receiver end may be characterized in terms of ASE noise and NLE-induced spectral deformation as follows:

In step 316, at time $t_2$, an optical spectrum trace $P_{SUT}(\lambda)$ of the SUT (i.e. at the receiver end in this example) is acquired.

In step 318 (expressed in more detail in FIG. 4), the signal contribution $S_{SUT}(\lambda)$ is discriminated from the ASE noise $N_{ASE\_SUT}(\lambda)$ on the optical spectrum trace $P_{SUT}(\lambda)$ of the SUT, and the relative signal deformation function $\Delta k_{NL}(\lambda)$ is estimated—which represents the change in the NLE-induced signal deformation function between the time $t_2$ and the commissioning time $t_1$, at the receiver end.

Figure 4:
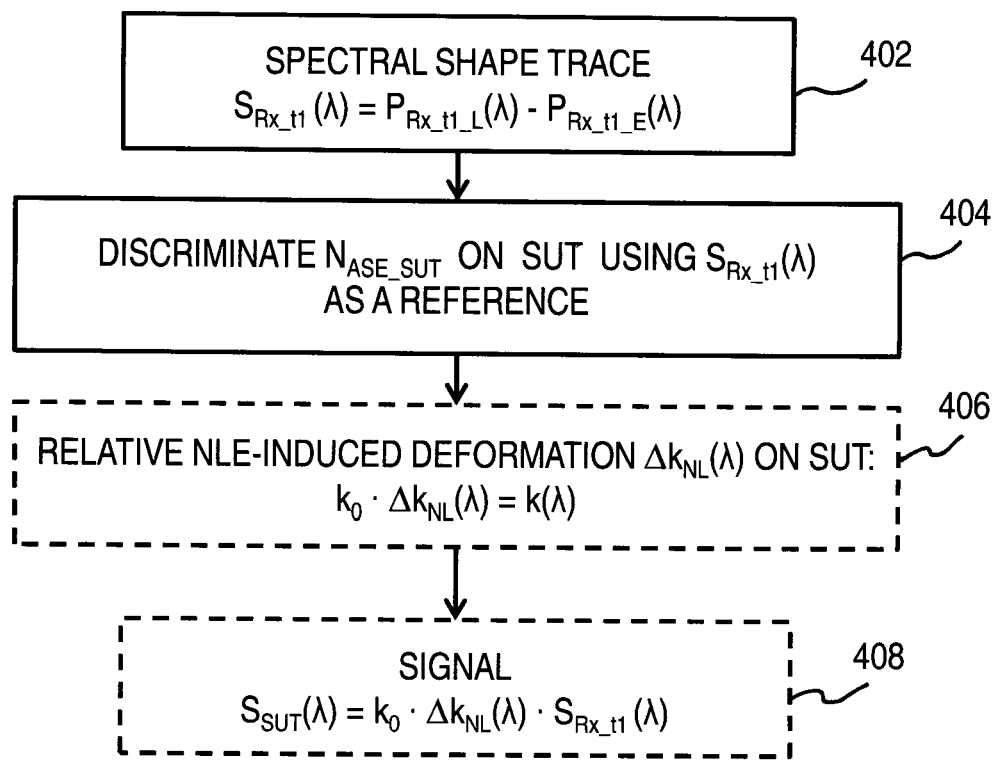
FIG. 4 is a flow chart showing in more detail step 318 in FIG. 3 of estimating the relative NLE-induced deformation on the SUT in FIG. 3.

Now referring to FIG. 4, step 318 is explained in more detail.

In step 402, the commissioning signal contribution $S_{Rx\_t1}(\lambda)$ at the receiver end will be used as a reference spectral shape trace $S_{ref}(\lambda)$ for discriminating the ASE noise contribution $N_{ASE\_SUT}(\lambda)$ from the signal contribution $S_{SUT}(\lambda)$ on the optical spectrum trace $P_{SUT}(\lambda)$ of the SUT. Accordingly, the spectral shape trace of the data-carrying signal contribution at time $t_1$ and at the receiver end is estimated using the commissioning optical spectrum traces $P_{Rx\_t1\_L}(\lambda)$, $P_{Rx\_t1\_E}(\lambda)$ acquired at the receiver end, i.e. in this example, by subtracting the extinguished-signal measurement $P_{Rx\_t1\_E}(\lambda)$ from the live-signal measurement $P_{Rx\_t1\_L}(\lambda)$:

$$S_{ref}(\lambda)=S_{Rx\_t1}(\lambda)=P_{Rx\_t1\_L}(\lambda)-P_{Rx\_t1\_E}(\lambda) \quad (3.6)$$

As explained hereinabove, the SUT contains a signal contribution $S_{SUT}(\lambda)$ and an ASE-noise contribution $N_{ASE\_SUT}(\lambda)$:

$$P_{SUT}(\lambda)=S_{SUT}(\lambda)+N_{ASE\_SUT}(\lambda) \quad (3.7a)$$

$$P_{SUT}(\lambda)=\Delta k_{NL}(\lambda)\cdot S_{ref}(\lambda)+N_{ASE\_SUT}(\lambda) \quad (3.7b)$$

$$P_{SUT}(\lambda)=k_0\cdot k_{NL\_SUT}(\lambda)\cdot k_F(\lambda)\cdot S_{Tx\_t1}(\lambda)+N_{ASE\_SUT}(\lambda) \quad (3.7c)$$

where $\Delta k_{NL}(\lambda)$ is the (as yet unknown) relative signal deformation function which represents the change in the NLE-induced signal deformation function between time $t_2$ and the commissioning time $t_1$, at the receiver end, i.e.

$$\Delta k_{NL}(\lambda)=k_{NL\_SUT}(\lambda)/k_{NL\_t1}(\lambda) \quad (3.8)$$

In step 404, from equation (3.7b) and the previously evaluated and recorded reference signal spectrum $S_{ref}(\lambda)$, the signal contribution $S_{SUT}(\lambda)$ may be discriminated from the ASE noise $N_{ASE\_SUT}(\lambda)$ by implementing one of the methods proposed in US Patent Application Publication US 2014/0328586 A1 to Gariepy et al., which is commonly owned by Applicant and hereby incorporated by reference. Using one of these methods, the relative signal deformation function $\Delta k_{NL}(\lambda)$ is estimated based on the power spectral density of the SUT and that of a reference signal spectrum $S_{ref}(\lambda)$ by using properties of the signal contribution $S_{SUT}(\lambda)$ and that of the ASE-noise contribution $N_{ASE\_SUT}(\lambda)$ to discriminate the two on the test optical spectrum trace $P_{SUT}(\lambda)$. These methods are predicated upon knowledge of the spectral shape of the signal in the absence of significant noise or spectral deformation. In the present step 404, this knowledge is provided by the reference optical spectrum trace $S_{ref}(\lambda)$ obtained at commissioning. Based on this knowledge and under the assumption that the ASE noise level is generally uniform in wavelength over a given spectral range used for the processing (or, more precisely, that the ASE-noise contribution variation is negligible compared to the signal contribution variation, i.e. $\Delta N_{ASE}(\lambda) \ll \Delta S(\lambda)$), the spectral deformation of the signal contribution of the SUT may be estimated using a comparison of the spectral variations (e.g. quantified as the derivative of the spectral shape) of the optical spectrum trace of the SUT with that of the reference optical spectrum trace $S_{ref}(\lambda)$. Details of an exemplary implementation of step 404 are described hereinbelow with reference to FIG. 5.

In step 406, the relative signal deformation function $\Delta k_{NL}(\lambda)$ may be estimated from the signal and ASE-noise contribution $N_{ASE\_SUT}(\lambda)$ found in step 404 as follows:

$$\Delta k_{NL}(\lambda) = (P_{SUT}(\lambda) - N_{ASE\_SUT}(\lambda))/S_{ref}(\lambda) \quad (3.9)$$

And, in step 408, the signal contribution $S_{SUT}(\lambda)$ to the SUT may be calculated:

$$S_{SUT}(\lambda) = P_{SUT}(\lambda) - N_{ASE\_SUT}(\lambda) \quad (3.10a)$$

or $$S_{SUT}(\lambda) = \Delta k_{NL}(\lambda) \cdot S_{ref}(\lambda) \quad (3.10b)$$

Back to FIG. 3, in step 320, once the relative signal deformation function $\Delta k_{NL}(\lambda)$ has been so determined, the actual NLE-induced signal deformation function $k_{NL\_SUT}(\lambda)$ between the transmitter end and the receiver end at test time $t_2$, may be calculated as follows:

$$k_{NL\_SUT}(\lambda) = k_{NL\_t1}(\lambda) \cdot \Delta k_{NL}(\lambda) \quad (3.11)$$

In step 322, one or more quality parameters characterizing the SUT are determined, directly or indirectly, using the estimated ASE-noise contribution $N_{ASE\_SUT}(\lambda)$ or the estimated absolute or relative signal deformation functions $k_{NL\_SUT}(\lambda)$, $\Delta k_{NL}(\lambda)$. The quality parameters may take the form of the ASE-only OSNR ($OSNR_{ASE}$), the signal-deformation OSNR ($OSNR_{SD}$), the Signal Deformation Factor (SDF), or any other parameter that may be used to characterize the NLE-induced spectral deformation or the ASE noise. Various quality parameters that may be determined are defined hereinbelow.

The thereby-determined quality parameter(s) are output for use, for example, in monitoring, maintenance or troubleshooting of a DWDM optical system. For example, the quality parameter(s) may be output by graphical display, by printing, by generating an electrical signal or by storing it in memory for later retrieval. Other parameters can also be displayed or otherwise output in a graphical or numerical form.

It should be appreciated that, at steps 302, 304, 306, 308 and 316, optical spectrum traces may be acquired using a single test instrument, i.e. a portable OSA, that is carried between the transmitter end and the receiver end. As known in the art, such a portable test system would typically comprise an optical spectrum analyzer device (the test hardware necessary to conduct optical spectrum analysis of an optical signal), a processing module and a memory. In this case, at steps 302, 304, 306, 308, 310, 312, 314, 318, 320 and/or 322, commissioning optical spectrum traces $P_{Tx\_t1\_E}(\lambda)$, $P_{Tx\_t1\_L}(\lambda)$, $P_{Rx\_t1\_E}(\lambda)$ and $P_{Rx\_t1\_L}(\lambda)$ and/or parameters and traces obtained from these traces may be recorded in the memory of the test instrument for later use to conduct steps 310, 312, 314, 318 and/or 320. Moreover, in this case, the processing module may be configured to conduct the processing steps, e.g., steps 310, 312, 314, 318, 320 and 322. The general functions of the OSA instrument, e.g. for control purposes or pre-processing of the acquired optical spectrum traces, may also be implemented on this same processing module. Alternatively, optical spectrum traces may be acquired using a plurality of test instruments, such as, e.g. monitoring OSAs permanently installed on the optical communication link, e.g. 100 (see FIG. 2), at tap couplers 1 and 5 for example. These variations also apply equivalently to the other methods described herein.

In another embodiment, a test system comprises a first monitoring instrument, a second monitoring instrument and, optionally, an external computer (where all or part of this external computer may be cloud-based). At steps 302 and 304, optical spectrum traces $P_{Tx\_t1\_E}(\lambda)$ and $P_{Tx\_t1\_L}(\lambda)$ are acquired using the first monitoring instrument (or first optical spectrum analyzer device) and, at steps 306, 308 and 310, optical spectrum traces $P_{Rx\_t1\_E}(\lambda)$, $P_{Rx\_t1\_L}(\lambda)$ and $P_{SUT}(\lambda)$ are acquired using the second monitoring instrument (or first optical spectrum analyzer device). Of course, in this case, data need be exchanged between the monitoring instruments or with the external computer. In this case, a processing module located in the external computer may be configured to conduct steps 310, 312, 314, 318, 320 and 322. The processing module may also be distributed among the monitoring instruments and, if employed, the external computer, such that some steps are conducted on the first monitoring module, some on the second monitoring module and optionally some on the external computer. Of course, although likely not very practical, separate test instruments could be employed for each acquisition.

It will also be understood that additional numerical processing may be employed in method 300 (as well as the other methods described herein) without departing from the described methodology. For example, some averaging may be used to reduce measurement noise or a smoothing function may be applied to the measured optical spectrum traces. A translation in optical frequency may also be applied to any of the acquired optical spectrum traces, followed by a resampling, in order to correct a wavelength drift of the optical communication signal over time or to correct a wavelength shift introduced by the measurements performed with different test instruments. Of course, one skilled in the art will appreciate that other pre-processing may be used in addition to, or in combination with, the herein-mentioned pre-processing.

Figure 5:
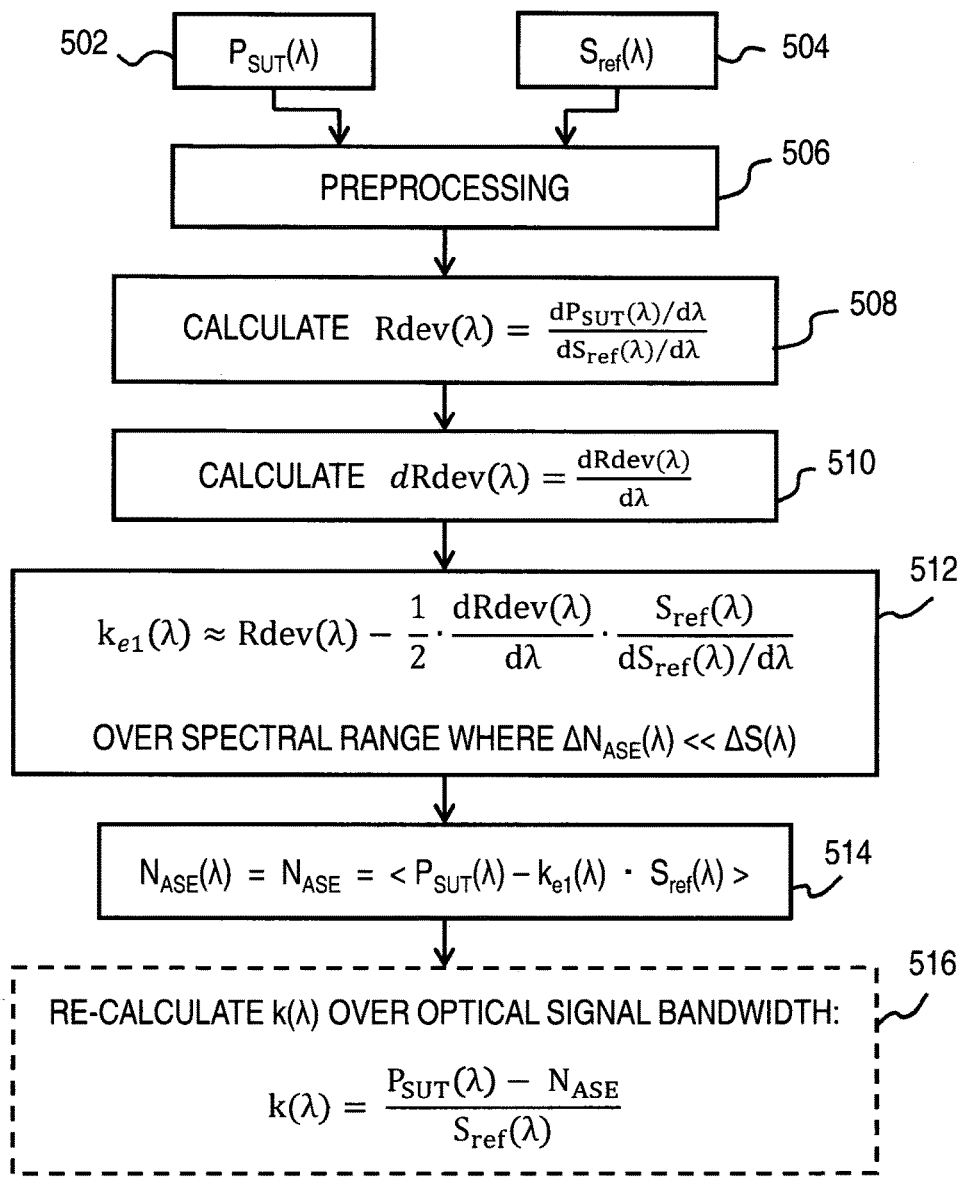
FIG. 5 is a flow chart showing the steps required for performing step 318 of FIG. 3 of discriminating the ASE-noise contribution from the signal contribution in the SUT.

FIG. 5 illustrates one embodiment of a suitable implementation of step 404 of the method 400 described hereinabove. The method 500 of FIG. 5 gives one specific implementation algorithm that may be suitable for processing the test trace $P_{SUT}(\lambda)$ and the reference trace $S_{ref}(\lambda)=S_{Rx\_t1}(\lambda)$ to estimate the spectral deformation of the signal contribution of the SUT as compared to a reference trace $S_{ref}(\lambda)$, which corresponds to the commissioning signal contribution $S_{Rx\_t1}(\lambda)$ at the receiver end in the case of the method 300 of FIG. 3. The method 500 of FIG. 5 is illustrated here for the specific case of 100 G PM-QPSK signals.

The method 500 of FIG. 5 is based on the following approach which uses the ratio $Rdev(\lambda)$ of the derivative of the test optical spectrum trace as a function of wavelength with respect to the derivative of the reference optical spectrum trace as a function of wavelength.

First, a ratio $k(\lambda)$ of the (as yet unknown) signal contribution $S_{SUT}(\lambda)$ of the SUT to the reference trace $S_{ref}(\lambda)$ is defined:

$$k(\lambda)=S_{SUT}(\lambda)/S_{ref}(\lambda) \quad (5.1)$$

In the case of the method 300 of FIG. 3, this ratio $k(\lambda)$ corresponds to the relative NLE-induced signal deformation function $\Delta k_{NL}(\lambda)$ multiplied by a gain/loss factor $k_0$ (i.e. $k(\lambda)=k_0 \cdot \Delta k_{NL}(\lambda)$). However, it should be noted that for the method 800 of FIG. 8 and the method 900 of FIG. 9 which are described hereinbelow and for which the reference trace is different, the ratio $k(\lambda)$ corresponds to the absolute NLE-induced deformation $k_{NL\_SUT}(\lambda)$ multiplied by a gain/loss factor $k_0$ (i.e. $k(\lambda)=k_0 \cdot k_{NL\_SUT}(\lambda)$). It is also noted that gain/loss factors $k_0$ are selected such that $\Delta k_{NL}(\lambda_{pk})=1$ and $k_{NL\_SUT}(\Delta_{pk})=1$.

Defining $Rdev(\lambda)$ as follows:

$$Rdev(\lambda) = \frac{dP_{SUT}(\lambda)/d\lambda}{dS_{ref}(\lambda)/d\lambda} = k(\lambda) + \frac{dk(\lambda)}{d\lambda} \cdot \frac{S_{ref}(\lambda)}{dS_{ref}(\lambda)/d\lambda} \quad (5.2)$$

By deriving $Rdev(\lambda)$ and neglecting the term incorporating the second derivative of $k(\lambda)$, we obtain:

$$\frac{dRdev(\lambda)}{d\lambda} \approx \frac{dk(\lambda)}{d\lambda} \cdot \left(2 - \frac{d^2 S_{ref}(\lambda)}{d^2\lambda} \cdot \frac{S_{ref}(\lambda)}{(dS_{ref}(\lambda)/d\lambda)^2}\right) \quad (5.3)$$

which yields:

$$\frac{dk(\lambda)}{d\lambda} \approx \frac{dRdev(\lambda)/d\lambda}{\left(2 - \frac{d^2 S_{ref}(\lambda)}{d^2\lambda} \cdot \frac{S_{ref}(\lambda)}{(dS_{ref}(\lambda)/d\lambda)^2}\right)} \quad (5.4)$$

If the term including the second derivative of $S_{ref}(\lambda)$ is very small and hence also may be neglected, the expression for $k(\lambda)$ may be further simplified:

$$k(\lambda) \approx Rdev(\lambda) - \frac{1}{2} \cdot \frac{dRdev(\lambda)}{d\lambda} \cdot \frac{S_{ref}(\lambda)}{dS_{ref}(\lambda)/d\lambda} \quad (5.5)$$

It is noted that, on account of the assumptions made to derive the above estimation of $k(\lambda)$, it is valid only within the spectral range of the SUT where the wavelength-dependent variation of the ASE-noise contribution is negligible compared to the corresponding variation of the signal contribution. This assumption mostly holds within the optical signal bandwidth, but is not generally valid close to the peak of the SUT, i.e. where the variation of the signal contribution may be small. In the case of typical 100 G PM-QPSK signals, it is found that this estimation of $k(\lambda)$ typically holds at least in a spectral region corresponding to a region where the power spectral density is about 1 to 3 dB below the peak power spectral density of the SUT. Such conditions may be found, for example, over an offset of 5 GHz to 10 GHz from the peak wavelength for a 100 G PM-QPSK signal.

It should also be understood that even though the term incorporating the second derivative of $S_{ref}(\lambda)$ is neglected to derive equation (5.5) of $k(\lambda)$, this term could also be preserved to yield a different equation for $k(\lambda)$ that would provide a result substantially equivalent to that of equation (5.5) and that could therefore be used equivalently in method 500.

In step 502, the test optical spectrum trace $P_{SUT}(\lambda)$ of the SUT to be characterized is obtained. The test trace $P_{SUT}(\lambda)$ comprises a data-carrying signal contribution $S_{SUT}(\lambda)$ and a ASE-noise contribution $N_{ASE}(\lambda)$ within the optical signal bandwidth of the SUT.

In step 504, a reference optical spectrum trace $S_{ref}(\lambda)=S_{Rx\_t1}(\lambda)$ as per step 402 of FIG. 4 is obtained.

In step 506, some signal pre-processing may be applied to the optical spectrum traces $P_{SUT}(\lambda)$ and $S_{ref}(\lambda)$. For example, a smoothing function may be applied to traces $P_{SUT}(\lambda)$ and $S_{ref}(\lambda)$ to smooth any acquisition noise. This may be helpful especially in view of calculating the derivatives of traces $P_{SUT}(\lambda)$ and $S_{ref}(\lambda)$, a process that is very sensitive to high-frequency wavelength-dependent power variations of noise.

Other pre-processing may be necessary to mutually align traces $P_{SUT}(\lambda)$ and $S_{ref}(\lambda)$ in wavelength. This may be required for example if the optical communication signal has drifted in wavelength between the commissioning time $t_1$ and the test time $t_2$, or to correct a wavelength shift introduced by the measurements performed with different optical spectrum analyzer instruments. Of course, one skilled in the art will appreciate that other pre-processing may be used in addition to, or in combination with, the herein-mentioned pre-processing.

The relative NLE-induced spectral deformation of the signal contribution $S_{SUT}(\lambda)$ of the SUT as compared to the reference trace $S_{ref}(\lambda)$ is now estimated in steps 508, 510, 512, 514 and 516.

In step 508, a ratio $Rdev(\lambda)$ of the derivative of the test trace $P_{SUT}(\lambda)$ as a function of wavelength with respect to the corresponding derivative of the reference trace $S_{ref}(\lambda)$ is calculated as follows:

$$Rdev(\lambda) = \frac{dP_{SUT}(\lambda)/d\lambda}{dS_{ref}(\lambda)/d\lambda} \quad (5.6)$$

In step 510, the derivative of the ratio $Rdev(\lambda)$ as a function of wavelength is also calculated:

$$\frac{dRdev(\lambda)}{d\lambda} \quad (5.7)$$

In step 512, a first estimation $k_{e1}(\lambda)$ of the ratio $k(\lambda)$ (which corresponds to the relative NLE-induced signal deformation function $\Delta k_{NL}(\lambda)$ for the case of method 300 of FIG. 3) is calculated using equation (5.5), over a first spectral range $SR_1$ where the assumptions used to derive this equation are found to hold. As mentioned hereinabove, in the case of typical 100 G PM-QPSK signals, it is found that this estimation of $k(\lambda)$ may hold in a spectral region corresponding to an offset of 5 GHz to 10 GHz from the peak wavelength.

In step 514, having calculated the ratio $k_{e1}(\lambda)$ over this first spectral range $SR_1$, an ASE-noise contribution $N_{ASE}(\lambda)$ can be calculated over this same range as:

$$N_{ASE}(\lambda)=P_{SUT}(\lambda)-k_{e1}(\lambda) \cdot S_{ref}(\lambda) \quad (5.8)$$

Because the ASE noise is assumed to be substantially constant in wavelength, the estimated ASE noise level $N_{ASE}$ is calculated as the average of the resulting $N_{ASE}(\lambda)$ over the first spectral range:

$$N_{ASE\_SUT}=N_{ASE}=<N_{ASE}(\lambda)> \quad (5.9)$$

In step 516, knowing the ASE-noise level, the ratio $k(\lambda)$ is re-calculated over a second larger spectral range corresponding approximately to the optical signal bandwidth of the SUT or to a substantial portion thereof, e.g. in the case of a 100 G PM-QPSK signal, a spectral range extending between −10 GHz and +10 GHz relative to the peak wavelength of the SUT:

$$k(\lambda) = \frac{P_{SUT}(\lambda) - N_{ASE}}{S_{ref}(\lambda)} \quad (5.10)$$

For the case of the method 300 of FIG. 3, the ratio $k(\lambda)$ provides the estimation of the relative NLE-induced signal deformation function: $k(\lambda)=k_0 \cdot \Delta k_{NL}(\lambda)$.

Then, in step 408 of FIG. 4, the signal contribution $S_{SUT}(\lambda)$ of the SUT may be calculated if required for the quality parameters to be evaluated:

$$S_{SUT}(\lambda)=P_{SUT}(\lambda)-N_{ASE\_SUT} \quad (5.11a)$$

or $$S_{SUT}(\lambda)=k_0 \cdot \Delta k_{NL}(\lambda) \cdot S_{ref}(\lambda) \quad (5.11b)$$

Figure 6:
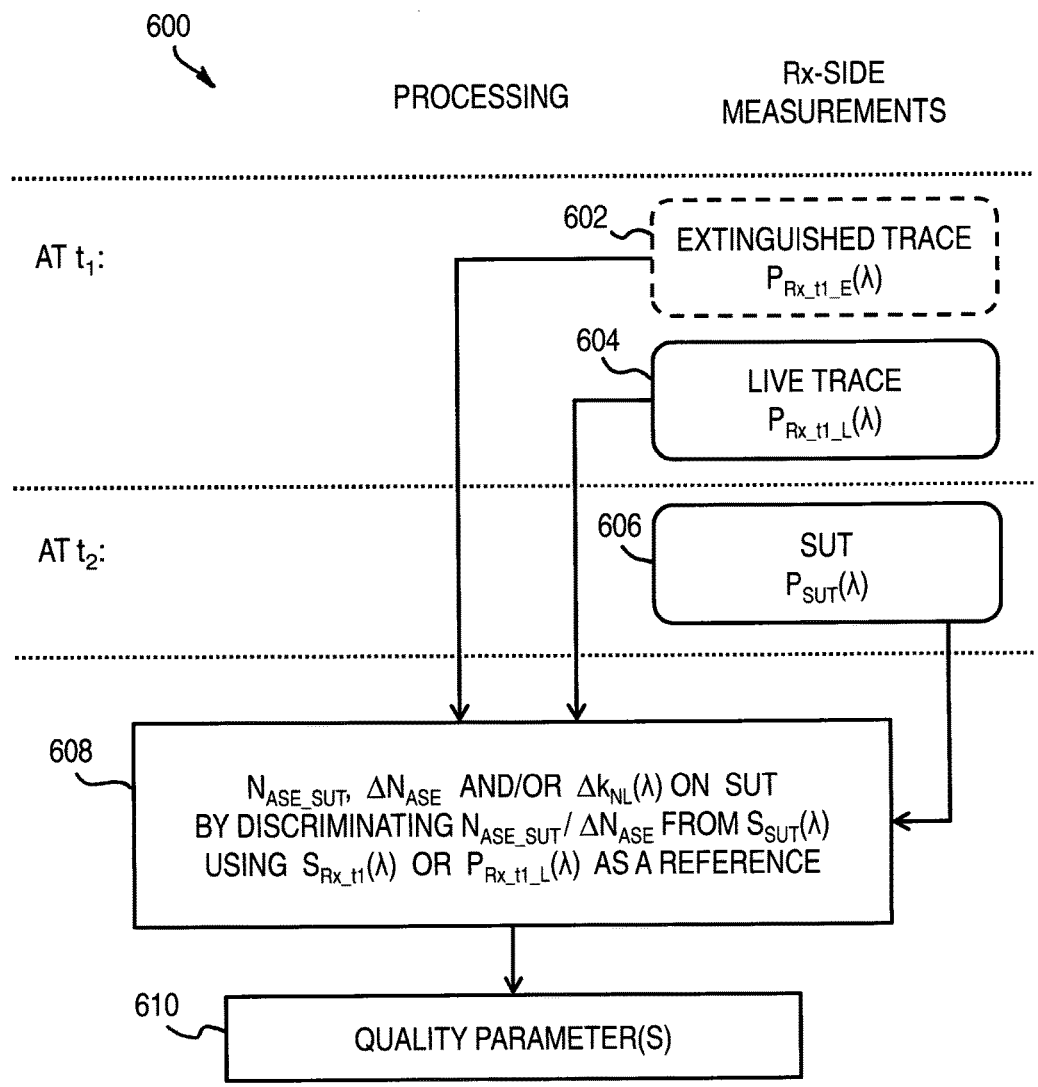
FIG. 6 is a flow chart illustrating a method for characterizing a polarization-multiplexed SUT, wherein extinguished and live signal optical spectrum traces are acquired only at the receiver end.

Now referring to FIG. 6, another exemplary test method 600 is now described in which commissioning reference traces are acquired only at the receiver end, or any other location where the ASE noise and/or the NLE-induced deformation is to be assessed (e.g. location B, Y or R in FIG. 2). In this embodiment, no commissioning traces are acquired close to a source point.

In this embodiment, the NLE-induced signal deformation function $k_{NL\_t1}(\lambda)$ at commissioning time is unknown and the actual NLE-induced signal deformation function $k_{NL\_SUT}(\lambda)$ found above in step 320 cannot be retrieved. Only the evolution of the NLE-induced signal deformation function from the date of commissioning to the subsequent date of measurement can be retrieved (i.e. the relative NLE-induced signal deformation function $\Delta k_{NL}(\lambda)$). This measurement provides an indication as to whether the NLEs have changed over time, the initial NLE conditions being unknown. This relative characterization may be useful in many monitoring, maintenance and troubleshooting applications. It is noted that the filtering-induced signal deformation function $k_F(\lambda)$ also cannot be retrieved from this test method.

Apart from those steps that are omitted, test method 600 of FIG. 6 is similar to test method 300 of FIG. 3 and like features will therefore not be repeatedly described.

In steps 602 and 604, acquisitions are first conducted at time $t_1$. Commissioning optical spectrum traces are acquired at the test point where the SUT is to be later assessed, both with an extinguished and a live optical communication signal within the considered optical signal bandwidth. More specifically, in step 602, a first commissioning optical spectrum trace $P_{Rx\_t1\_E}(\lambda)$ is acquired at the test point while the optical signal on the communication link is extinguished within the optical signal bandwidth (e.g. the source is turned off, disconnected or blocked). In step 604, a second commissioning optical spectrum trace $P_{Rx\_t1\_L}(\lambda)$ is acquired at the receiver end while the optical signal on the communication link is live within the optical signal bandwidth. It will be understood that commissioning trace $P_{Rx\_t1\_E}(\lambda)$ provides an estimation of the ASE-noise level on commissioning trace $P_{Rx\_t1\_L}(\lambda)$.

It should be noted that step 602 may is considered as optional because it could be replaced by a step of retrieving a previously-obtained estimation of the ASE-noise level on commissioning optical spectrum trace $P_{Rx\_t1\_L}(\lambda)$. The ASE-noise level estimation could be retrieved, e.g., from an OSNR measurement conducted at the test point at commissioning.

Then, at any other time $t_2$ after commissioning ($t_2 \neq t_1$) and typically when the optical communication link is active and in normal use, the optical communication signal at the receiver end may be characterized in terms of either or both ASE noise and relative NLE-induced spectral deformation as follows:

In step 606, at time $t_2$, an optical spectrum trace $P_{SUT}(\lambda)$ of the SUT (i.e. at the receiver end in this example) is acquired.

In step 608, the relative NLE-induced signal deformation function $\Delta k_{NL}(\lambda)$ is estimated—which represents the change in the NLE-induced signal deformation function between the time $t_2$ and the commissioning time $t_1$, at the receiver end—and/or the signal contribution $S_{SUT}(\lambda)$ is discriminated from the ASE noise $N_{ASE\_SUT}(\lambda)$ on the optical spectrum trace $P_{SUT}(\lambda)$ of the SUT. In one embodiment, step 608 is performed as described hereinabove with reference to FIG. 4, i.e., the commissioning signal contribution $S_{Rx\_t1}(\lambda)$ at the receiver end is estimated using the commissioning trace $P_{Rx\_t1\_L}(\lambda)$ and an estimation of its ASE-noise level as provided, e.g. from $P_{Rx\_t1\_E}(\lambda)$ or as an input value to the system. The commissioning signal contribution $S_{Rx\_t1}(\lambda)$ is then used as a reference spectral shape trace $S_{ref}(\lambda)$ for discriminating the ASE-noise contribution $N_{ASE\_SUT}(\lambda)$ from the signal contribution $S_{SUT}(\lambda)$ on the optical spectrum trace $P_{SUT}(\lambda)$ of the SUT. The ASE-noise contribution $N_{ASE\_SUT}(\lambda)=N_{ASE\_SUT}$ is found in step 514.

In another embodiment where no estimation of the ASE-noise level on the commissioning trace $P_{Rx\_t1\_L}(\lambda)$ is available (step 602 is omitted and no input value is provided), step 608 may be performed using the commissioning trace $P_{Rx\_t1\_L}(\lambda)$ directly as the reference spectral shape trace $S_{ref}(\lambda)$ in the method described with reference to FIG. 5. In this case however, the ASE-noise level $N_{ASE}$ that is calculated in step 514 corresponds to a variation $\Delta N_{ASE}$ of the ASE-noise contribution between the optical signal at the commissioning time $t_1$ and the SUT at time $t_2$ such that:

$$\frac{1}{OSNR_{ASE\_\Delta}} = \frac{1}{OSNR_{ASE\_SUT}} - \frac{1}{OSNR_{ASE\_t1\_L}} \quad (6.1)$$

where $OSNR_{ASE\_SUT}$ denotes the ASE-only OSNR (see definition below) of the SUT, $OSNR_{ASE\_t1\_L}$ denotes the ASE-only OSNR on the commissioning trace $P_{Rx\_t1\_L}(\lambda)$ and the $OSNR_{ASE\_\Delta}$ denotes the differential ASE-only OSNR corresponding to the ASE-noise contribution variation $\Delta N_{ASE}$ calculated in step 514. It follows that the ASE-noise on the SUT may be retrieved from an estimation of the ASE-noise contribution on the commissioning trace $P_{Rx\_t1\_L}(\lambda)$ (e.g. if it later becomes available) and the variation $\Delta N_{ASE}$ of the ASE-noise contribution:

$$\frac{1}{OSNR_{ASE\_SUT}} = \frac{1}{OSNR_{ASE\_t1\_L}} + \frac{1}{OSNR_{ASE\_\Delta}} \quad (6.2)$$

In step 610, one or more quality parameters characterizing the SUT are determined, directly or indirectly, using the estimated ASE-noise contribution $N_{ASE\_SUT}(\lambda)$ or the estimated relative signal deformation function, $\Delta k_{NL}(\lambda)$.

Quality Parameters

An example of a quality parameter that can be determined is the ASE-only OSNR, which may be defined, in dB units, (normalized to be equivalent to that corresponding to a 0.1-nm resolution bandwidth) as follows:

$$OSNR_{ASE} = 10 \log_{10}\left(\frac{\int_{CBW} S(\lambda)d\lambda}{\frac{0.1 \text{ nm}}{NBW}\int_{NBW} N_{ASE}(\lambda)d\lambda}\right) \quad (6.3)$$

where CBW is the channel bandwidth and NBW is the bandwidth over which the ASE-noise is to be evaluated.

Throughout this specification, the optical spectrum trace $P_{SUT}(\lambda)$ of the SUT has been conceptually separated into a signal contribution $S_{SUT}(\lambda)$ and an ASE-noise contribution $N_{ASE\_SUT}(\lambda)$:

$$P_{SUT}(\lambda) = S_{SUT}(\lambda) + N_{ASE\_SUT}(\lambda) \quad (6.4)$$

However, test trace $P_{SUT}(\lambda)$ may also be regarded as comprising three separate contributions, i.e. a non-NLE-deformed signal contribution $S'_{SUT}(\lambda)$ (which represents the signal contribution at the transmitter end as would theoretically appear at the test point of the SUT in absence of any NLEs), a NLE-induced spectral deformation noise contribution $N_{NL\_SUT}(\lambda)$ and the ASE-noise contribution $N_{ASE\_SUT}(\lambda)$:

$$P_{SUT}(\lambda) = S'_{SUT}(\lambda) + N_{NL\_SUT}(\lambda) + N_{ASE\_SUT}(\lambda) \quad (6.5)$$

where $$S'_{SUT}(\lambda) = k_0 \cdot k_F(\lambda) \cdot S_{Tx\_t1}(\lambda) \quad (6.6)$$

$N_{NL\_SUT}(\lambda)$ is defined as:

$$N_{NL\_SUT}(\lambda) = k_0 \cdot k_F(\lambda) \cdot S_{Tx\_t1}(\lambda) \cdot (k_{NL\_SUT}(\lambda) - 1) \quad (6.7)$$

Then, another example of a quality parameter is the NLE-induced signal-deformation-equivalent OSNR (OSNR$_{SD}$) (normalized to be equivalent to that corresponding to a 0.1-nm resolution bandwidth), which may be defined, in dB units, as:

$$OSNR_{SD} = 10 \log_{10}\left(\frac{\int_{CBW} S'_{SUT}(\lambda)d\lambda}{\frac{0.1 \text{ nm}}{NBW}\int_{NBW} N_{NL\_SUT}(\lambda)d\lambda}\right) \quad (6.8)$$

Yet another example of a quality parameter is a Signal Deformation Factor SDF that may be defined as:

$$SDF = \frac{\langle |k_{NL\_SUT}(\lambda) - k_{NL\_SUT}(\lambda pk)| \rangle}{k_{NL\_SUT}(\lambda pk)} \quad (6.9)$$

where brackets $\langle f(\lambda) \rangle$ signify an average of function $f(\lambda)$ over a given spectral range and the brackets $|f(\lambda)|$ signify the absolute value operation on $f(\lambda)$.

Alternatively, a different Signal Deformation Factor SDF' may be defined as the second-order coefficient of $k(\lambda)$:

$$k(\lambda) = a + b(\lambda - \lambda_{pk}) + SDF'(\lambda - \lambda_{pk})^2 \quad (6.10)$$

which is obtained by fitting a second-order polynomial to the estimated signal deformation function $k_e(\lambda)$.

Yet another example of a quality parameter is an extended OSNR (OSNR$_E$) (normalized to be equivalent to that corresponding to a 0.1-nm resolution bandwidth), which takes into account both the ASE-noise contribution $N_{ASE\_SUT}(\lambda)$ and the NLE-induced spectral deformation noise $N_{NL\_SUT}(\lambda)$ and which may be defined as:

$$OSNR_E = 10 \log_{10}\left(\frac{\int_{CBW} S(\lambda)d\lambda}{\frac{0.1 \text{ nm}}{NBW}\int_{NBW} N_E(\lambda)d\lambda}\right) \quad (6.11)$$

where $$N_E(\lambda) = N_{NL\_SUT}(\lambda) + N_{ASE\_SUT}(\lambda) \quad (6.12)$$

$$N_E(\lambda) = P_{SUT}(\lambda) \cdot S'_{SUT}(\lambda) \quad (6.13)$$

and where the bandwidth NBW may correspond to the channel bandwidth CBW for instance.

Of course, other useful quality parameters may be determined as well, such as, e.g., that described in Patent Application Publication US 2014/0328586, op. cit. It will be understood that the herein described quality parameters are examples only and that other quality parameters not defined herein could be determined as well and that the definition of the specified quality parameters could also vary.

Figure 7:
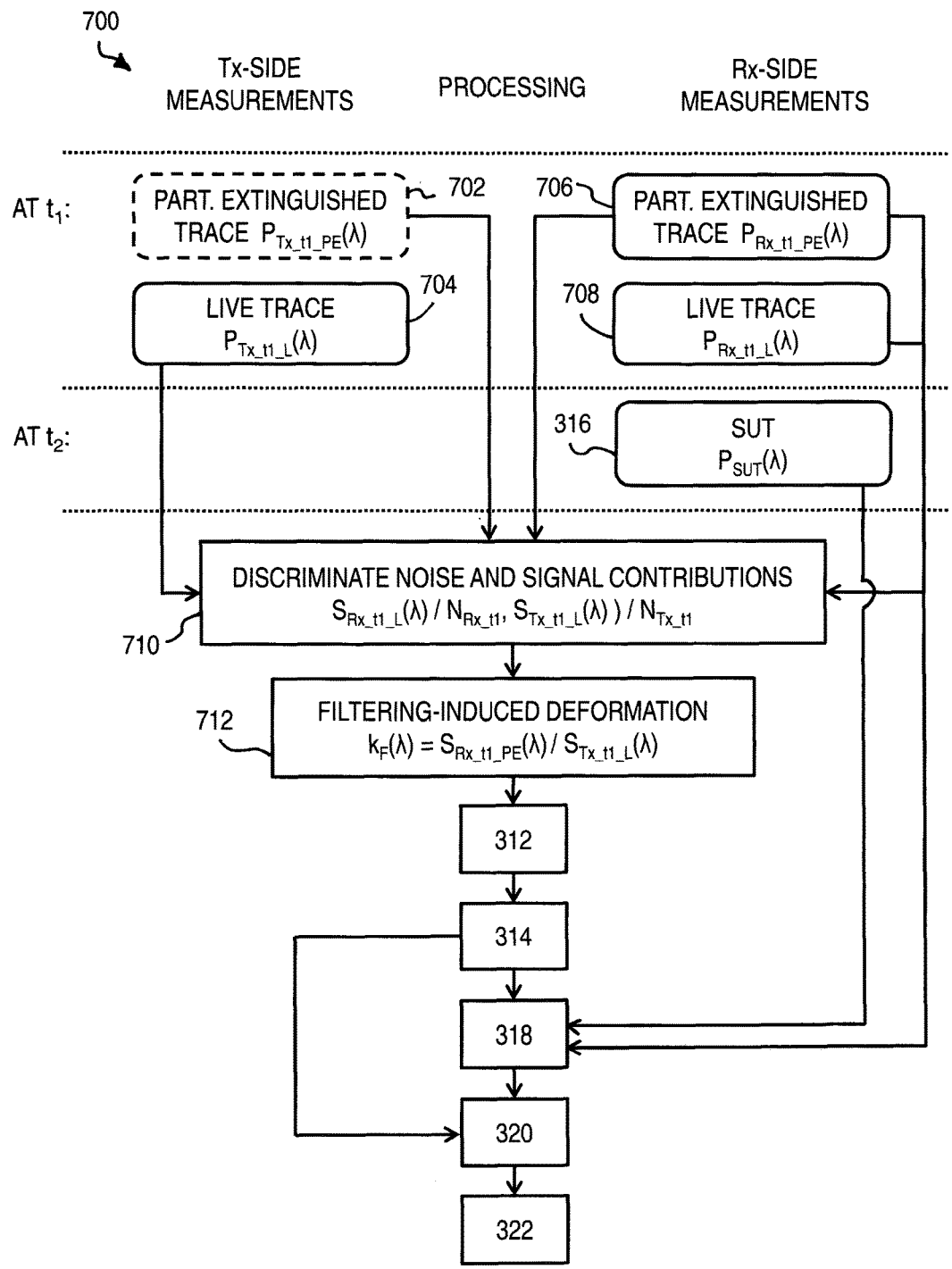
FIG. 7 is a flow chart illustrating a method for characterizing a polarization-multiplexed SUT, wherein partially-extinguished and live signal optical spectrum traces are acquired both at the transmitter end and the receiver end.

Now referring to FIG. 7, yet another exemplary test method 700 in which commissioning traces are acquired with a partially extinguished (i.e. low power) signal instead of a completely extinguished signal, as well as with a full live signal power. This method may be particularly suitable for some applications where it is not possible to extinguish the optical communication signal at commissioning (e.g., because the network configuration is such that empty channels are blocked). In this case, at commissioning time $t_1$, the steps of acquiring optical spectrum traces with an extinguished optical communication signal are instead performed with a partially extinguished (or low power) signal. For example, the power of live signals on the optical communication link may be attenuated by 3 dB or so, such that NLEs may be assumed negligible.

Apart from additional steps and modifications required on account of the signal being only partially extinguished at commissioning, test method 700 of FIG. 7 is similar to test method 300 of FIG. 3 and, again, like features will therefore not be repeatedly described.

In steps 702, 704, 706 and 708, acquisitions are first conducted at time $t_1$. Commissioning optical spectrum traces are acquired close to the transmitter end and to the receiver end, both with a partially-extinguished and a live optical communication signal within the considered optical signal bandwidth. More specifically, in step 702, a first commissioning optical spectrum trace $P_{Tx\_t1\_PE}(\lambda)$ (also referred to herein elsewhere as $P_{Tx\_t1\_E}(\lambda)$) is acquired at the transmitter end while the optical signal on the communication link is partially extinguished within the optical signal bandwidth (i.e. the power of the source is reduced e.g. partially attenuated). In embodiments where only the ASE noise and/or the relative NLE-induced signal deformation function $\Delta k_{NL}(\lambda)$ is to be estimated, a partial extinction of 1 to 3 dB or so of the global signal power including all WDM channels is typically sufficient, whereas for embodiments where NLEs are to be estimated, it has been found that a partial extinction of 2 to 3 dB is typically adequate to ensure that NLEs can be assumed negligible while still maintaining an active communication channel. Some optical communication networks can even tolerate partial extinction of up to 4 dB or so in certain cases. Exact test conditions should of course be specifically determined for the particular optical signal and network under test. In step 704, a second commissioning optical spectrum trace $P_{Tx\_t1\_L}(\lambda)$ is acquired at the transmitter while the optical signal on the communication link is at full live signal power within the optical signal bandwidth. In step 706, a third commissioning optical spectrum trace $P_{Rx\_t1\_PE}(\lambda)$ (also referred to herein elsewhere as $P_{Rx\_t1\_E}(\lambda)$) is acquired at the receiver end while the optical signal on the communication link is partially extinguished within the optical signal bandwidth, as in step 702. In step 708, a fourth commissioning optical spectrum trace $P_{Rx\_t1\_L}(\lambda)$ is acquired at the receiver end while the optical signal on the communication link is at full live signal power within the optical signal bandwidth.

In step 710, the signal and ASE-noise contributions are mutually-discriminated in the live-signal measurements $P_{Rx\_t1\_L}(\lambda)$ and $P_{Tx\_t1\_L}(\lambda)$. As opposed to the extinguished-signal measurements of the test method 300 of FIG. 3, in the general case, the low-power measurements $P_{Rx\_t1\_PE}(\lambda)$, $P_{Tx\_t1\_PE}(\lambda)$ include both a signal contribution and an ASE-noise contribution.

$$P_{Rx\_t1\_L}(\lambda)=S_{Rx\_t1\_L}(\lambda)+N_{ASE\_Rx\_t1}(\lambda) \quad (7.1a)$$

$$P_{Rx\_t1\_PE}(\lambda)=S_{Rx\_t1\_PE}(\lambda)+N_{ASE\_Rx\_t1}(\lambda) \quad (7.1b)$$

$$P_{Tx\_t1\_L}(\lambda)=S_{Tx\_t1\_L}(\lambda)+N_{ASE\_Tx\_t1}(\lambda) \quad (7.1c)$$

$$P_{Tx\_t1\_PE}(\lambda)=S_{Tx\_t1\_PE}(\lambda)+N_{ASE\_Tx\_t1}(\lambda) \quad (7.1d)$$

where the ASE-noise contribution can be assumed to be substantially the same for the live-signal and low-power optical spectrum traces.

In order to estimate the total signal deformation of the data-carrying signal contribution between the transmitter end and the receiver end at the commissioning time $t_1$ (expressed as the total signal deformation function $k_{t1}(\lambda)$, which corresponds to the signal deformation at full live signal power), the signal contribution needs to be discriminated from the ASE-noise contribution in the live-signal optical spectrum traces $P_{Rx\_t1\_L}(\lambda)$ and $P_{Tx\_t1\_L}(\lambda)$. In this case, the ASE-noise contribution is not directly found from the partially-extinguished traces. However, under the assumption that the ASE-noise contribution is substantially the same on the live-signal and low-power optical spectrum traces, the noise contribution on the optical spectrum traces may be cancelled by subtracting one from the other to yield a reference spectral shape trace that is exempt of ASE noise, i.e.:

$$S_{ref\_Rx}(\lambda)=P_{Rx\_t1\_L}(\lambda)-P_{Rx\_t1\_PE}(\lambda)=S_{Rx\_t1\_L}(\lambda)-S_{Rx\_t1\_PE}(\lambda) \quad (7.2a)$$

at the receiver or $$S_{ref\_Tx}(\lambda)=P_{Tx\_t1\_L}(\lambda)-P_{Tx\_t1\_PE}(\lambda)=S_{Tx\_t1\_L}(\lambda)-S_{Tx\_t1\_PE}(\lambda) \quad (7.2b)$$

at the transceiver end.

Because the ASE-noise contributions cancel out, the so-obtained reference spectral shape traces $S_{ref\_Rx}(\lambda)$, $S_{ref\_Tx}(\lambda)$ are exempt of ASE-noise. However, in the receiver case, the reference trace $S_{ref\_Rx}(\lambda)$ represents neither the spectral shape of the optical communication signal with NLE-induced signal deformation nor the spectral shape of the optical communication signal without NLE-induced signal deformation, but rather an hybrid of the two. However, the reference spectral shape trace $S_{ref\_Rx}(\lambda)$ does account for filtering-induced signal deformations. That being said, the reference spectral shape trace $S_{ref\_Rx}(\lambda)$ may be employed to discriminate the ASE-noise from the signal contribution on both the live-signal optical spectrum trace $P_{Rx\_t1\_L}(\lambda)$ and the low-power optical spectrum trace $P_{Rx\_t1\_PE}(\lambda)$.

The method described with reference to FIG. 5 may be then employed to mutually-discriminate the signal and noise contributions in the live-signal measurements $P_{Rx\_t1\_L}(\lambda)$, $P_{Tx\_t1\_L}(\lambda)$ and the partially-extinguished measurements $P_{Rx\_t1\_PE}(\lambda)$, $P_{Tx\_t1\_PE}(\lambda)$, using respectively the reference spectral shape traces $S_{ref\_Rx}(\lambda)$ and $S_{ref\_Tx}(\lambda)$ of equations (7.2a) and (7.2b) by defining respectively:

$$P_{Rx\_t1\_L}(\lambda)=k_{Rx}(\lambda) \cdot S_{ref\_Rx}(\lambda)+N_{ASE\_Rx\_t1}(\lambda) \quad (7.3a)$$

$$P_{Tx\_t1\_L}(\lambda)=k_{Tx}(\lambda) \cdot S_{ref\_Tx}(\lambda)+N_{ASE\_Tx\_t1}(\lambda) \quad (7.3b)$$

In the case of method 700 of FIG. 7 the ratios $k_{Rx}(\lambda)$ and $k_{Tx}(\lambda)$ do not correspond to the NLE-induced deformation $k_{NL\_SUT}(\lambda)$ or the relative NLE-induced deformation $\Delta k_{NL}'(\lambda)$. However, the signal contribution to the live-signal optical spectrum traces and to the low-power optical spectrum traces may still be retrieved from the discriminated ASE-noise contributions as follows:

$$S_{Rx\_t1\_L}(\lambda)=P_{Rx\_t1\_L}(\lambda)-N_{ASE\_Rx\_t1}(\lambda) \quad (7.4a)$$

$$S_{Rx\_t1\_PE}(\lambda)=P_{Rx\_t1\_PE}(\lambda)-N_{ASE\_Rx\_t1}(\lambda) \quad (7.4b)$$

$$S_{Tx\_t1\_L}(\lambda)=P_{Tx\_t1\_L}(\lambda)-N_{ASE\_Tx\_t1}(\lambda) \quad (7.4c)$$

$$S_{Tx\_t1\_PE}(\lambda)=P_{Tx\_t1\_PE}(\lambda)-N_{ASE\_Tx\_t1}(\lambda) \quad (7.4d)$$

It is noted that, in the specific case for which it is known that there is no significant ASE-noise on the live-signal commissioning optical spectrum trace $P_{Tx\_t1\_L}(\lambda)$ acquired at the transmitter side, the acquisition of partially-extinguished commissioning optical spectrum trace $P_{Tx\_t1\_PE}(\lambda)$ (step 702) may be omitted and the signal contribution $S_{Tx\_t1\_L}(\lambda)$ be found directly from the live-signal measurement $P_{Tx\_t1\_L}(\lambda)=S_{Tx\_t1\_L}(\lambda)$.

In step 712, the filtering-induced signal deformation between the transmitter end and the receiver end (herein expressed as the filtering-induced signal deformation function $k_F(\lambda)$) is estimated using the signal contributions $S_{Tx\_t1\_L}(\lambda)$, $S_{Rx\_t1\_PE}(\lambda)$ found in step 710 such that:

$$k_F(\lambda)=S_{Rx\_t1\_PE}(\lambda)/S_{Tx\_t1\_L}(\lambda) \cdot S_{Tx\_t1\_L}(\lambda_{pk})/S_{Rx\_t1\_PE}(\lambda_{pk}) \quad (7.5a)$$

It is noted that, in other embodiments, the filtering-induced signal deformation function $k_F(\lambda)$ may be instead estimated using the signal contributions $S_{Tx\_t1\_PE}(\lambda)$, $S_{Rx\_t1\_PE}(\lambda)$ found in step 710 such that:

$$k_F(\lambda)=S_{Rx\_t1\_PE}(\lambda)/S_{Tx\_t1\_PE}(\lambda) \cdot S_{Tx\_t1\_PE}(\lambda_{pk})/S_{Rx\_t1\_PE}(\lambda_{pk}) \quad (7.5b)$$

Furthermore, in yet another embodiment, the filtering-induced signal deformation function $k_F(\lambda)$ may be estimated directly from the partially-extinguished commissioning traces $P_{Tx\_t1\_PE}(\lambda)$ and $P_{Rx\_t1\_PE}(\lambda)$ such that:

$$k_F(\lambda)=P_{Rx\_t1\_PE}(\lambda)/P_{Tx\_t1\_PE}(\lambda) \cdot P_{Tx\_t1\_PE}(\lambda_{pk})/P_{Rx\_t1\_PE}(\lambda_{pk}) \quad (7.5c)$$

Once the signal contributions $S_{Tx\_t1}(\lambda)$, $S_{Rx\_t1}(\lambda)$ are found, steps 312, 314, 316, 318, 320 and 322 of the method 300 of FIG. 3 (described hereinabove) may be applied directly to determine one or more quality parameters characterizing the SUT.

It will be understood that, as in the method 600 of FIG. 6, the method 700 of FIG. 7 may be readily modified for test cases for which commissioning reference traces are acquired only at the receiver end, i.e. no commissioning traces are acquired close to the transmitter end. Steps 702, 704, 710, 312, 314 and 320 are then omitted to estimate the evolution of the NLE-induced signal deformation function from the commissioning time $t_1$ to the subsequent test time $t_2$ (i.e. the relative NLE-induced signal deformation function $\Delta k_{NL}(\lambda)$).

Figure 8:
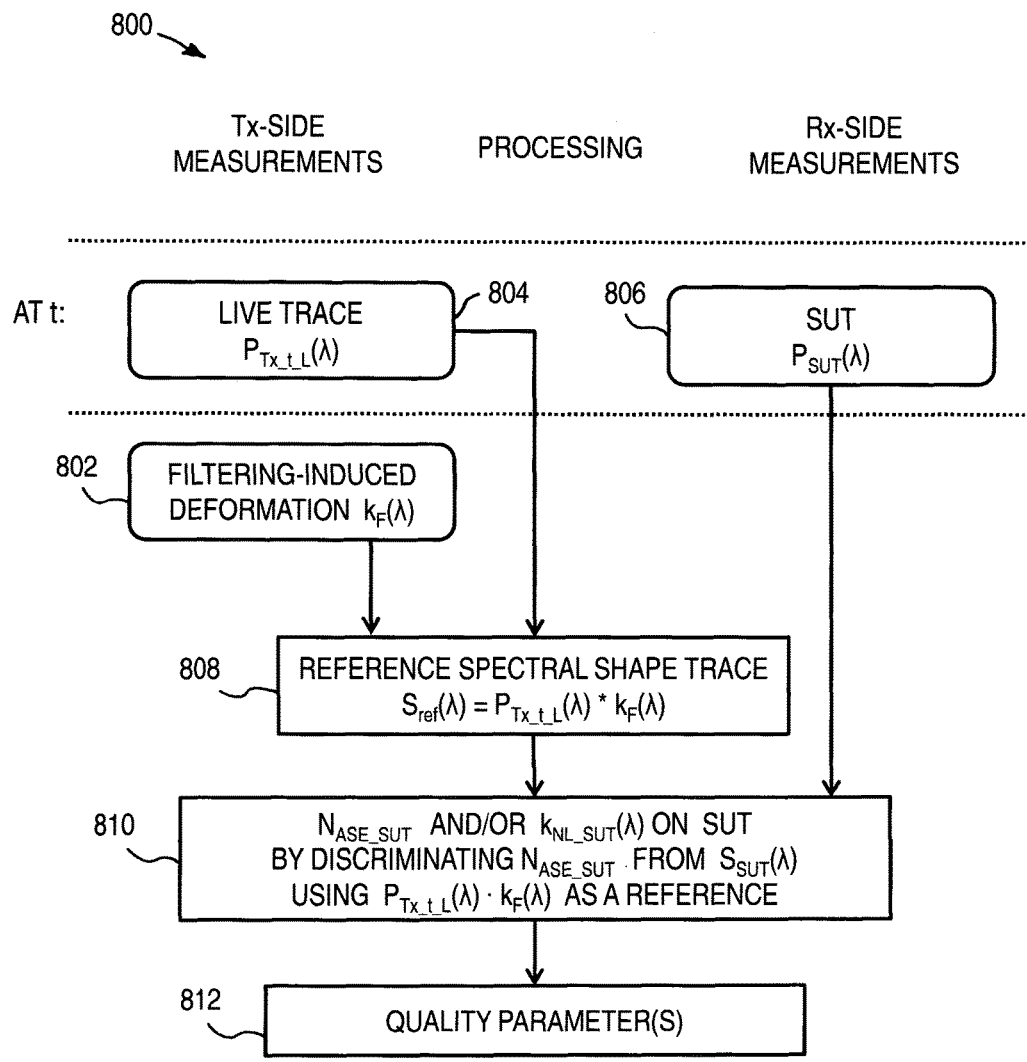
FIG. 8 is a flow chart illustrating a method for characterizing a polarization-multiplexed SUT, wherein a trace acquired at the transmitter end and an estimated filtering-induced signal deformation function $k_F(\lambda)$ are employed to generate the reference spectral shape trace $S_{ref}(\lambda)$.

Now referring to FIG. 8, another exemplary test method 800 is now described in which the reference spectral shape trace $S_{ref}(\lambda)$, used for discriminating the noise and signal contributions on the SUT, is calculated from the commissioning optical spectrum trace $P_{Tx\_t1\_L}(\lambda)$ acquired at the transmitter end and an estimated add-drop filtering-induced signal deformation function $k_F(\lambda)$.

Apart from steps that are being modified or omitted, test method 800 of FIG. 8 is similar to test method 300 of FIG. 3 and like features will therefore not be repeatedly described.

In step 802, an estimation of the add-drop filtering-induced signal deformation function $k_F(\lambda)$ is provided, which represents the deformation caused by optical add-drop filtering affecting the optical communication signal between the transmitter end and the receiver end. In one embodiment, the filtering-induced signal deformation function $k_F(\lambda)$ has been previously estimated and recorded for later use using any of the methods described herein, e.g. step 310 of FIG. 3 or step 712 of FIG. 7.

Then, typically when the optical communication link is active and in normal use, the optical communication signal at the receiver end may be characterized in terms of either or both ASE noise and NLE-induced spectral deformation as follows:

In step 804, at time t, an optical spectrum trace $P_{Tx\_t\_L}(\lambda)$ is first acquired at the transmitter end while the optical signal on the communication link is live within the optical signal bandwidth.

In step 806, again at time t (or at another time t' where it can be assumed that the optical spectrum at the transmitter end has not significantly changed compared to acquired trace $P_{Tx\_t\_L}(\lambda)$) and at a given test point, an optical spectrum trace $P_{SUT}(\lambda)$ of the SUT (i.e. at the receiver end in this example) is acquired.

In step 808, a reference spectral shape trace $S_{ref}(\lambda)$ is calculated from the signal $S_{Tx\_t1}(\lambda)$ of commissioning trace $P_{Tx\_t\_L}(\lambda)$ and the filtering-induced signal deformation function $k_F(\lambda)$:

$$S_{ref}(\lambda) = S_{Tx\_t}(\lambda) \cdot k_F(\lambda) \tag{8.1}$$

where, in embodiments for which the ASE-noise contribution is negligible on trace $P_{Tx\_t\_L}(\lambda)$, the signal contribution $S_{Tx\_t}(\lambda)$ is directly obtained from the commissioning trace $P_{Tx\_t\_L}(\lambda)$ such that:

$$S_{Tx\_t}(\lambda) \approx P_{Tx\_t\_L}(\lambda) \tag{8.2}$$

and $$S_{ref}(\lambda) = P_{Tx\_t\_L}(\lambda) \cdot k_F(\lambda) \tag{8.3}$$

Of course, in other embodiments, the ASE-noise contribution $N_{ASE\_Tx\_t}(\lambda)$ may need to be characterized as described herein elsewhere, e.g. by acquiring a commissioning trace at the transmitter end with a totally or partially extinguished signal.

The thereby-obtained reference spectral shape trace $S_{ref}(\lambda)$ represents the spectral shape of the optical communication signal as would be present at the receiver end should there be no NLE-induced signal deformation between the transmitter and receiver ends. Nonetheless, the reference spectral shape trace $S_{ref}(\lambda)$ does account for filtering-induced signal deformations.

In step 810, the NLE-induced signal deformation function $k_{NL\_SUT}(\lambda)$ is estimated by mutually-discriminating the signal contribution $S_{SUT}(\lambda)$ and the ASE-noise contribution $N_{ASE\_SUT}(\lambda)$ in the optical spectrum trace $P_{SUT}(\lambda)$ of the SUT using reference spectral shape trace $S_{ref}(\lambda)$ let:

$$P_{SUT}(\lambda) = k_0 \cdot k_{NL\_SUT}(\lambda) \cdot S_{ref}(\lambda) + N_{ASE\_SUT}(\lambda) \tag{8.4}$$

Step 810 is performed as described hereinabove with reference to FIG. 5 to find the ratio $k(\lambda)$ of the signal contribution $S_{SUT}(\lambda)$ of the SUT to the reference trace $S_{ref}(\lambda)$:

$$k(\lambda) = S_{SUT}(\lambda) / S_{ref}(\lambda) \tag{8.5}$$

In the case of method 800 of FIG. 8 the ratio $k(\lambda)$ directly corresponds to the absolute NLE-induced deformation $k_{NL\_SUT}(\lambda)$ multiplied by a gain/loss factor $k_0$ ($k_0 \cdot k_{NL\_SUT}(\lambda)$), the ASE-noise contribution $N_{ASE\_SUT}(\lambda) = N_{ASE\_SUT}$ being found in step 514.

In step 812, one or more quality parameters characterizing the SUT are determined, directly or indirectly, using the estimated ASE-noise contribution $N_{ASE\_SUT}(\lambda)$ or the estimated absolute signal deformation function $k_{NL\_SUT}(\lambda)$.

Figure 9:
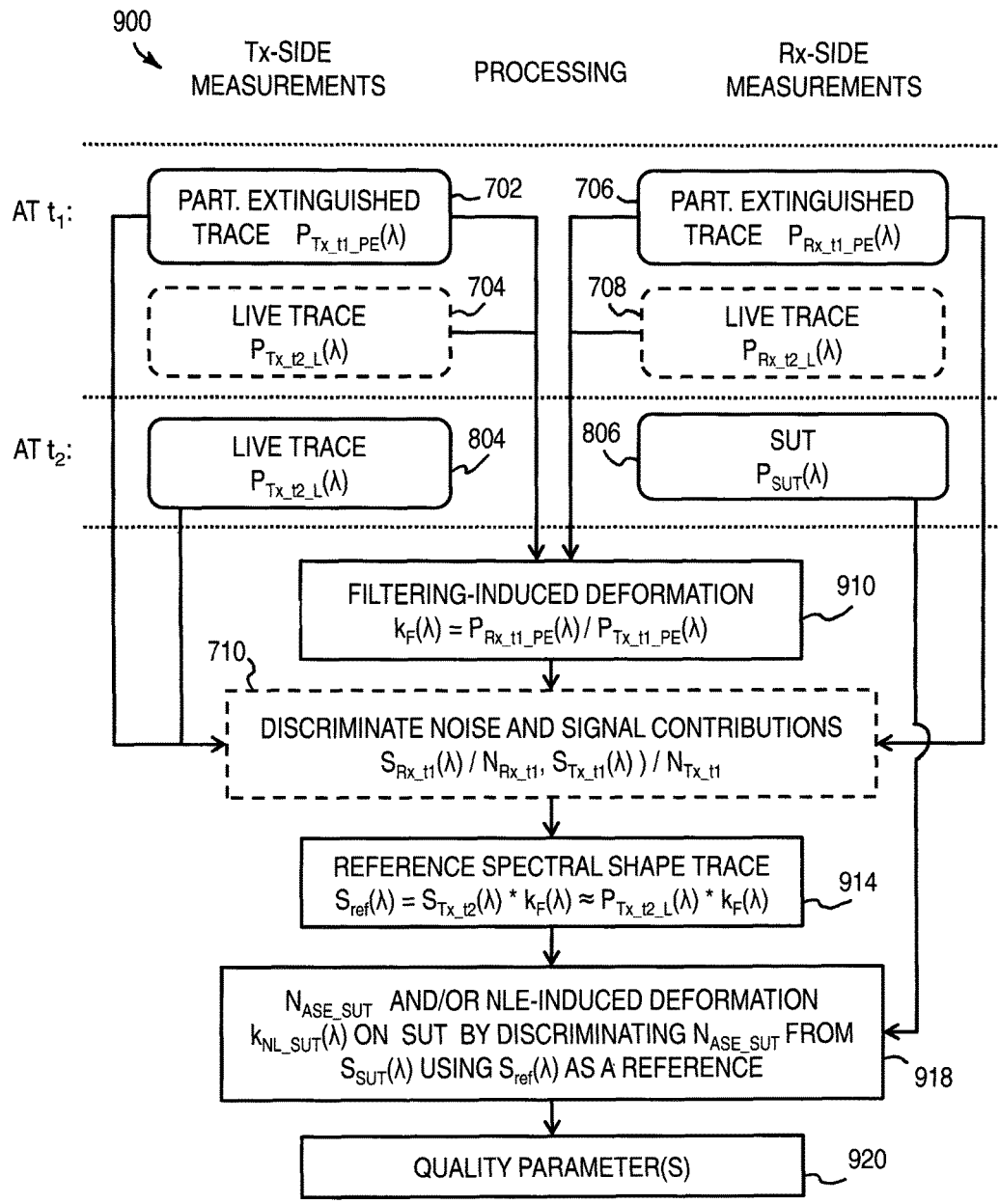
FIG. 9 is a flow chart illustrating a method for characterizing a polarization-multiplexed SUT, wherein a trace acquired at the transmitter end and an estimated filtering-induced signal deformation function $k_F(\lambda)$ are employed to generate the reference spectral shape trace $S_{ref}(\lambda)$ and wherein partially-extinguished and, optionally, live signal optical spectrum traces are acquired at the transmitter end and the receiver end in order to estimate the filtering-induced signal deformation function $k_F(\lambda)$.

Now referring to FIG. 9, another exemplary test method 900, which is an application of the test method 800 of FIG. 8, is now described. In this embodiment, commissioning traces are acquired both at the transmitter and the receiver ends, or any other location where the ASE noise and/or the NLE-induced deformation is to be assessed. As in the test method 800 of FIG. 8, in this the embodiment, the reference spectral shape trace $S_{ref}(\lambda)$ that is used in discriminating the noise and signal contributions on the SUT is calculated from both the optical spectrum trace $P_{Tx\_t2\_L}(\lambda)$ acquired at the transmitter end and the estimated add-drop filtering-induced signal deformation function $k_F(\lambda)$. In the case of method 900 of FIG. 9, the filtering-induced signal deformation function $k_F(\lambda)$ is estimated from commissioning traces acquired with a partially extinguished optical communication signal.

Apart from those steps that have been modified or omitted, test method 900 of FIG. 9 is similar to test method 700 of FIG. 7 and like features will therefore not be repeatedly described.

In steps 702 and 706, acquisitions are first conducted at time $t_1$. Commissioning optical spectrum traces are acquired respectively close to the transmitter end and to the receiver end, both with a partially-extinguished optical communication signal within the considered optical signal bandwidth. More specifically, in step 702, a first commissioning optical spectrum trace $P_{Tx\_t1\_PE}(\lambda)$ is acquired at the transmitter end while the optical signal on the communication link is partially extinguished within the optical signal bandwidth (i.e. the power of the source is reduced e.g. partially attenuated). In step 706, a second commissioning optical spectrum trace $P_{Rx\_t1\_PE}(\lambda)$ is acquired at the receiver end while the optical signal on the communication link is partially extinguished within the optical signal bandwidth.

In step 910, the filtering-induced signal deformation between the transmitter end and the receiver end (herein expressed as the filtering-induced signal deformation function $k_F(\lambda)$) is estimated:

Under the partially-extinguished condition, optical spectrum traces acquired at the transmitter $P_{Tx\_t1\_PE}(\lambda)$ and at the receiver end $P_{Rx\_t1\_PE}(\lambda)$ both include a signal contribution such that:

$$P_{Tx\_t1\_PE}(\lambda)=S_{Tx\_t1\_PE}(\lambda)+N_{ASE\_Tx\_t1}(\lambda) \quad (9.1)$$

$$P_{Rx\_t1\_PE}(\lambda)=S_{Rx\_t1\_PE}(\lambda)+N_{ASE\_Rx\_t1}(\lambda) \quad (9.2)$$

Under the assumption that NLEs are negligible on the partially-extinguished measurements and neglecting the effect of the ASE-noise contribution, the add-drop filtering-induced signal deformation function $k_F(\lambda)$ may be approximated as follows:

$$\begin{aligned}k_F(\lambda) &= S_{Rx\_t1\_PE}(\lambda)/S_{Tx\_t1\_PE}(\lambda) \cdot \\ &\quad S_{Tx\_t1\_PE}(\lambda_{pk})/S_{Rx\_t1\_PE}(\lambda_{pk}) \\ &\approx P_{Rx\_t1\_PE}(\lambda)/P_{Tx\_t1\_PE}(\lambda) \cdot \\ &\quad P_{Tx\_t1\_PE}(\lambda_{pk})/P_{Rx\_t1\_PE}(\lambda_{pk})\end{aligned} \quad (9.3)$$

Of course, optionally, the estimation of the filtering-induced signal deformation function $k_F(\lambda)$ may be further refined as described hereinabove in step 712 if commissioning optical spectrum traces are further acquired with a live signal at optional steps 704 and 706 and signal and noise contributions are mutually discriminated on the live-signal optical spectrum traces at optional step 710 (described herein above with reference to FIG. 7).

Then, at any other time $t_2$ after commissioning ($t_2 \neq t_1$) and typically when the optical communication link is active and in normal use, the optical communication signal at the receiver end may be characterized in terms of either or both ASE noise and relative NLE-induced spectral deformation as follows:

In step 804, an optical spectrum trace $P_{Tx\_t2\_L}(\lambda)$ is first acquired at the transmitter end while the optical signal on the communication link is live within the optical signal bandwidth.

In step 806, at a given test point, an optical spectrum trace $P_{SUT}(\lambda)$ of the SUT (i.e. at the receiver end in this example) is acquired.

In step 914, a reference spectral shape trace $S_{ref}(\lambda)$ is calculated from the signal contribution $S_{Tx\_t2}(\lambda)$ to the optical spectrum trace $P_{Tx\_t2\_L}(\lambda)$ and the filtering-induced signal deformation function $k_F(\lambda)$:

$$S_{ref}(\lambda)=S_{Tx\_t2}(\lambda) \cdot k_F(\lambda) \quad (9.4)$$

where, in embodiments for which the ASE-noise contribution is negligible on the trace $P_{Tx\_t2\_L}(\lambda)$, the signal contribution $S_{Tx\_t2}(\lambda)$ is directly obtained from the commissioning trace $P_{Tx\_t2\_L}(\lambda)$:

$$S_{Tx\_t1}(\lambda) \approx P_{Tx\_t2\_L}(\lambda) \quad (9.5)$$

and $$S_{ref}(\lambda)=P_{Tx\_t2\_L}(\lambda) \cdot k_F(\lambda) \quad (9.6)$$

Optionally, the ASE-noise contribution $N_{ASE\_Tx\_t1}(\lambda)$ may be characterized at step 712 i.e. as described with reference to FIG. 7 so as to find the signal contribution $S_{Tx\_t2}(\lambda)$.

The thereby-obtained reference spectral shape trace $S_{ref}(\lambda)$ represents the spectral shape of the optical communication signal as would be present at the receiver end were there to be no NLE-induced signal deformation between the transmitter and receiver ends. Nonetheless, the reference spectral shape trace $S_{ref}(\lambda)$ does account for filtering-induced signal deformations.

In step 918, the NLE-induced signal deformation function $k_{NL\_SUT}(\lambda)$ is estimated by mutually-discriminating the signal contribution $S_{SUT}(\lambda)$ and the ASE-noise contribution $N_{ASE\_SUT}(\lambda)$ in the optical spectrum trace $P_{SUT}(\lambda)$ of the SUT using reference spectral shape trace $S_{ref}(\lambda)$ by defining:

$$P_{SUT}(\lambda)=k_0 \cdot k_{NL\_SUT}(\lambda) \cdot S_{ref}(\lambda)+N_{ASE\_SUT}(\lambda) \quad (9.7)$$

Step 918 is performed as described hereinabove with reference to FIG. 5 to find the ratio $k(\lambda)$ of the signal contribution $S_{SUT}(\lambda)$ of the SUT to the reference trace $S_{ref}(\lambda)$:

$$k(\lambda)=S_{SUT}(\lambda)/S_{ref}(\lambda) \quad (9.8)$$

As in method 800 of FIG. 8, the ratio $k(\lambda)$ directly corresponds to the absolute NLE-induced deformation $k_{NL\_SUT}(\lambda)$ multiplied by a gain/loss factor $k_0$ ($k_0 \cdot k_{NL\_SUT}(\lambda)$).

In step 920, one or more quality parameters characterizing the SUT are determined, directly or indirectly, using the estimated ASE-noise contribution $N_{ASE\_SUT}(\lambda)$ or the estimated absolute signal deformation function $k_{NL\_SUT}(\lambda)$.

Figure 10:
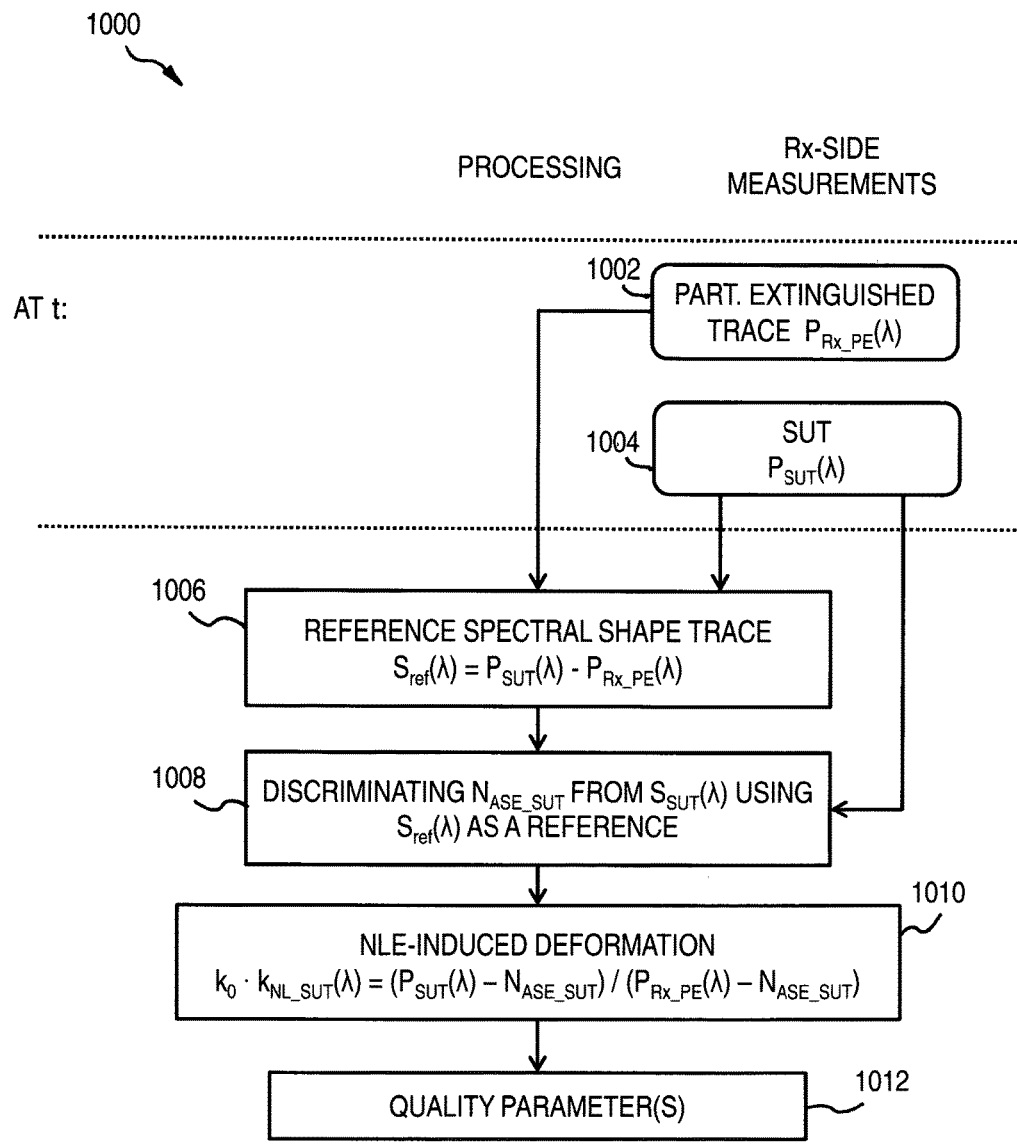
FIG. 10 is a flow chart illustrating a method for characterizing a polarization-multiplexed SUT, wherein no commissioning traces are acquired and wherein partially-extinguished and live signal optical spectrum traces are acquired at the receiver end.

Now referring to FIG. 10, another exemplary test method 1000, which does not require acquisitions at commissioning, is now described. At any time t where an SUT is to be characterized, two optical spectrum traces are acquired at the receiver end (or any other point where an SUT is to be characterized), one with a partially-extinguished optical communication signal and one with full live signal power (i.e. the SUT). These two traces allow for characterization of the ASE noise on the SUT and, assuming that the partially-extinguished optical communication signal suffers from no or negligible NLE-induced deformation, these same two traces also allow for characterization of the NLE-induced deformation $k_{NL\_SUT}(\lambda)$.

It is noted that in order for the partially-extinguished optical communication signal to suffer from no or negligible NLE-induced deformation, the partial extinction should be applied to more than one WDM channel. Partially extinguishing only the channel corresponding to the SUT would typically not be sufficient to substantially eliminate the NLE-induced deformations. As mentioned above, it has been found that a partial extinction of 2 to 3 dB is typically adequate for NLEs to be assumed negligible while still maintaining an active communication channel. Some optical communication networks can even tolerate a partial extinction of up to 4 dB or so in certain cases. Exact test conditions should of course be specifically determined for the particular optical signal and network under test.

In steps 1002 and 1004, acquisitions are typically conducted at any same time t, i.e. over a given time period or typically on a same day, where an optical communication signal is to be characterized. These acquisitions are also performed at a same given test point along the optical communication link, e.g., close to the receiver end. More specifically, in step 1002, a low-power optical spectrum trace $P_{Rx\_PE}(\lambda)$ is acquired at the test point while the optical signals on the communication link are partially extinguished. This may be performed either by controlling the emitted power of the source directly at the transmitter or by partially attenuating the optical signals close to the transmitter end, e.g. by inducing a loss on the optical signals. In step 1004, an optical spectrum trace $P_{SUT}(\lambda)$ of the SUT is acquired when the optical communication link is active and in normal use, i.e. at full live signal power. Of course, the low-signal optical spectrum trace $P_{Rx\_PE}(\lambda)$ and the test optical spectrum trace $P_{SUT}(\lambda)$ include both a signal contribution and an ASE-noise contribution:

$$P_{SUT}(\lambda)=S_{SUT}(\lambda)+N_{ASE\_SUT}(\lambda) \quad (10.1a)$$

$$P_{Rx\_PE}(\lambda)=S_{Rx\_PE}(\lambda)+N_{ASE\_SUT}(\lambda) \quad (10.1b)$$

Because both the low-signal optical spectrum trace $P_{Rx\_PE}(\lambda)$ and the test optical spectrum trace $P_{SUT}(\lambda)$ are acquired at the same point along the optical communication link and at the same time t, it is assumed that the ASE-noise contribution is substantially the same. It will be understood that this assumption normally holds for partial extinction in step 1002 of any number of channels on a wavelength-multiplexed optical communication link if the global optical signal power including all channels remains within 3 dB or so of the full live signal power (and even up to 5 dB in certain cases).

A differential NLE-induced signal deformation function $\Delta k_{NL}'(\lambda)$ between the low-power optical signal and the SUT may be expressed as:

$$S_{SUT}(\lambda) = k_0 \cdot \Delta k_{NL}'(\lambda) \cdot S_{Rx\_PE}(\lambda) \quad (10.2)$$

where the gain/loss factor $k_0$ is selected such that, e.g., $k_0 = S_{SUT}(\lambda_{pk})/S_{Rx\_PE}(\lambda_{pk})$ and where $\lambda_{pk}$ is the central wavelength of the optical communication signal.

In step 1006, a reference spectral shape trace $S_{ref}(\lambda)$ is calculated from the test optical spectrum trace $P_{SUT}(\lambda)$ and the low-power optical spectrum trace $P_{Rx\_PE}(\lambda)$:

$$S_{ref}(\lambda) = P_{SUT}(\lambda) - P_{Rx\_PE}(\lambda) = S_{SUT}(\lambda) - S_{Rx\_PE}(\lambda) \quad (10.3)$$

Because the ASE-noise contributions cancel out, the so-obtained reference spectral shape trace $S_{ref}(\lambda)$ is exempt of ASE-noise but represents neither the spectral shape of the optical communication signal with NLE-induced signal deformation nor the spectral shape of the optical communication signal without NLE-induced signal deformation but rather an hybrid of the two. However, the reference spectral shape trace $S_{ref}(\lambda)$ does account for filtering-induced signal deformations. That being said, the reference spectral shape trace $S_{ref}(\lambda)$ may be employed to discriminate the ASE-noise from the signal contribution on both the test optical spectrum trace $P_{SUT}(\lambda)$ and the low-power optical spectrum trace $P_{Rx\_PE}(\lambda)$ as follows:

In step 1008, the signal contribution $S_{SUT}(\lambda)$ and the ASE-noise contribution $N_{ASE\_SUT}(\lambda)$ are mutually discriminated in the optical spectrum trace $P_{SUT}(\lambda)$ of the SUT using reference spectral shape trace $S_{ref}(\lambda)$ by defining:

$$P_{SUT}(\lambda) = k(\lambda) \cdot S_{ref}(\lambda) + N_{ASE\_SUT}(\lambda) \quad (10.4)$$

Step 1008 may be performed as described hereinabove with reference to FIG. 5 to find the ASE-noise contribution $N_{ASE\_SUT}(\lambda) = N_{ASE\_SUT}$ in step 514.

In the case of method 1000 of FIG. 10 the ratio $k(\lambda)$ does not correspond to the NLE-induced deformation $k_{NL\_SUT}(\lambda)$ or the relative NLE-induced deformation $\Delta k_{NL}'(\lambda)$. However, the signal contribution to the test optical spectrum trace $P_{SUT}(\lambda)$ and to the low-power optical spectrum trace $P_{Rx\_PE}(\lambda)$ may both be retrieved from the discriminated ASE-noise contribution $N_{ASE\_SUT}(\lambda) = N_{ASE\_SUT}$:

$$S_{SUT}(\lambda) = P_{SUT}(\lambda) - N_{ASE\_SUT}(\lambda) \quad (10.5a)$$

$$S_{Rx\_PE}(\lambda) = P_{Rx\_PE}(\lambda) - N_{ASE\_SUT}(\lambda) \quad (10.5b)$$

In step 1010, the differential NLE-induced signal deformation function $\Delta k_{NL}'(\lambda)$ may be found from the discriminated signal contributions:

$$k_0 \cdot \Delta k_{NL}'(\lambda) = S_{SUT}(\lambda)/S_{Rx\_PE}(\lambda) \quad (10.6)$$

$$= (P_{SUT}(\lambda) - N_{ASE\_SUT})/(P_{Rx\_PE}(\lambda) - N_{ASE\_SUT})$$

Now, assuming that the partially-extinguished optical communication signal suffers from no or negligible NLE-induced deformation, the differential NLE-induced signal deformation function $\Delta k_{NL}'(\lambda)$ actually corresponds to the absolute NLE-induced deformation $k_{NL\_SUT}(\lambda)$ on the SUT:

$$k_0 \cdot \Delta k_{NL}'(\lambda) = S_{SUT}(\lambda)/S_{Rx\_PE}(\lambda) \quad (10.7)$$

$$= (P_{SUT}(\lambda) - N_{ASE\_SUT})/(P_{Rx\_PE}(\lambda) - N_{ASE\_SUT})$$

In step 1012, one or more quality parameters characterizing the SUT are determined, directly or indirectly, using the estimated ASE-noise contribution $N_{ASE\_SUT}(\lambda)$ or the estimated differential NLE-induced signal deformation function $\Delta k_{NL}'(\lambda)$ or absolute signal deformation function $k_{NL\_SUT}(\lambda)$.

Figure 11:
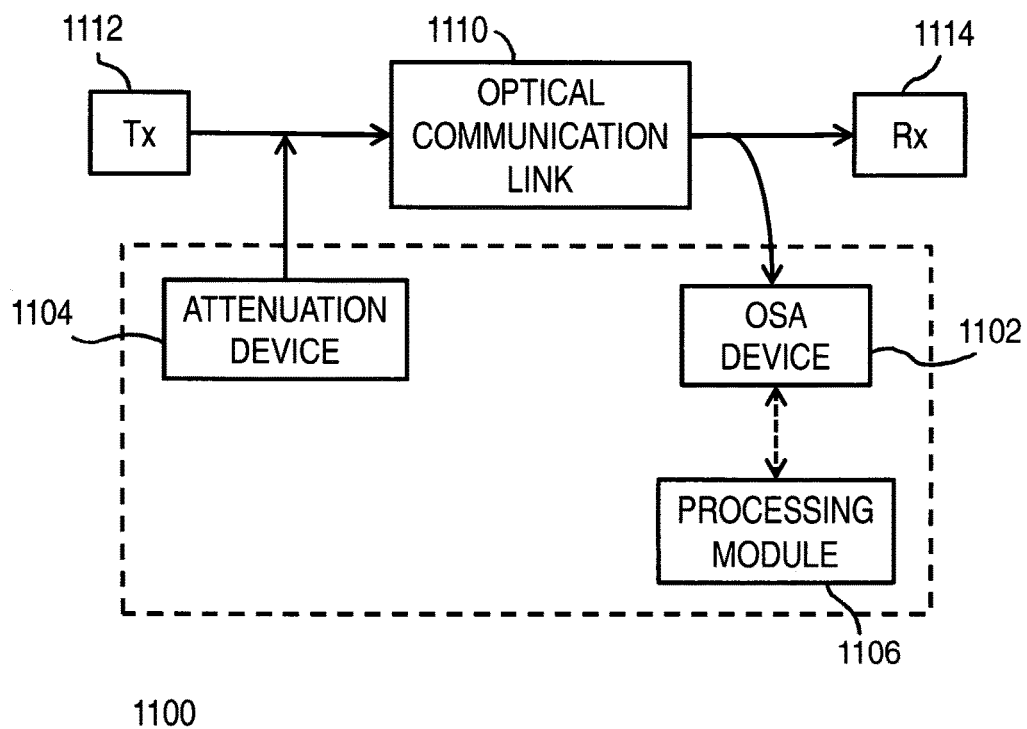
FIG. 11 is a block diagram illustrating a test system suitable for implementing the method of FIG. 10.

FIG. 11 shows an example of a test system 1100 suitable for conducting method 1000 of FIG. 10. The test system may be employed on an optical communication link 1110 between a transmitter 1112 and a receiver 1114. The test system 1100 comprises an optical spectrum analyzer device 1102 (i.e. the test hardware necessary to conduct optical spectrum analysis of an optical signal), an attenuation device 1104 and a processing module 1106. The attenuation device 1104 is to be connected on the optical communication link 1110 at a source point of the polarization-multiplexed optical signal (i.e. next to the transmitter 1112), in order to temporarily and partially extinguish the polarization-multiplexed optical signal for conducting step 1002. For example, an apparatus that is based on optical fiber bending, such as the variable-attenuation device described in U.S. Pat. No. 7,710,552 to He (which is commonly owned by Applicant and hereby incorporated by reference), may be employed for that purpose. Of course, other attenuation devices may be employed as well or, in other embodiments, the power of the polarization-multiplexed optical signal may be adjusted by directly controlling the emitted power at the transmitter. The OSA device 1102 is to be connected at a test point on the optical communication link (i.e. at the receiver end or any other test point where the ASE noise and/or the NLE-induced deformation is to be assessed). It may be connected via a tap coupler for example. The OSA device 1102 may be employed to perform the acquisitions of steps 1002 and 1004. The processing module 1106 may be configured to conduct the processing steps, e.g., steps 1006, 1008, 1010 and 1012. The processing module 1106 is typically implemented in software comprising computer-readable instructions that are to be executed by a generic computer. The generic computer(s) executing the processing module software may be integrated with, partially integrated with or physically separate from the OSA analyzer device 1102.

It should be appreciated that, at steps 1002 and 1004, optical spectrum traces may be acquired using a single test instrument, e.g. a portable or a permanently-installed monitoring instrument, connected at a test point along the optical communication link. As known in the art, such a test instrument typically comprises an OSA device and a computer including a memory. In this case, at steps 1002, 1004, 1006, 1008, 1010 and/or 1012, acquired optical spectrum traces $P_{Rx\_PE}(\lambda)$ and $P_{SUT}(\lambda)$ and/or parameters and traces obtained from these traces may be recorded in the memory of the test instrument for later use to conduct steps 1006, 1008, 1010 and/or 1012. If the OSA device 1102 and the processing module 1106 are together integrated in a test instrument, general control and processing functions of the OSA device 1102, e.g. for control purposes or pre-processing of the acquired optical spectrum traces, and the processing module 1106 may be implemented on the same computer. It will be understood that, alternatively, the processing module 1106 employed to conduct steps 1006, 1008, 1010 and/or 1012 may reside on an external computer, separate from the OSA device 1102. Also, separate test instruments could be employed for each acquisition.

As explained hereinabove, it will also be understood that additional numerical processing may also be employed in method 1000, such as averaging, smoothing, frequency translation and/or resampling, without departing from the described methodology.

As mentioned above, characterization of the absolute NLE-induced deformation on the SUT with the method 1000 of FIG. 10 generally requires that the partial extinction be applied to more than one channel (for the partially-extinguished optical communication signal to suffer from no or negligible NLE-induced deformation). Conversely, the ASE noise be well be characterized by partially extinguishing only the optical channel corresponding to the SUT. However, in this case, NLE-induced deformations are typically not negligible on the partially-extinguished optical communication signal and, it follows that the NLE-induced deformation cannot be reliably estimated.

Figure 12:
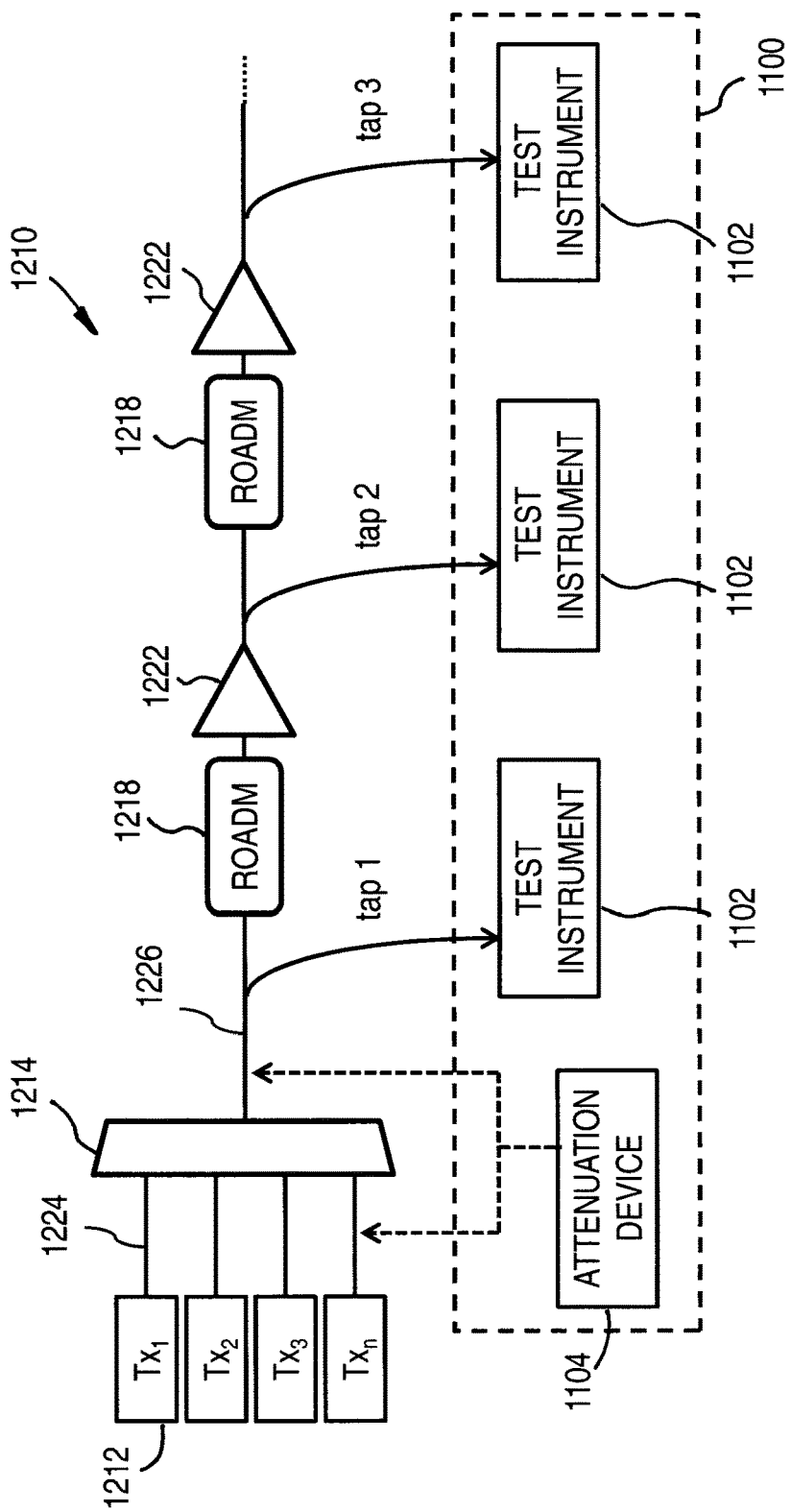
FIG. 12 is a block diagram illustrating possible applications of the method of FIG. 10 and the test system of FIG. 11 on an optical communication link.

FIG. 12 illustrates some possible applications of the method 1000 of FIG. 10 and the test system of FIG. 11 on an optical communication link under test 1210, which includes a plurality of optical add-drop filters 1218 and optical amplifiers 1218 distributed along the communication link 1210, as well as monitoring tap ports (tap 1, tap2, tap 3). The signals from a plurality of transmitters 1212 are multiplexed on the optical communication link 1210 using a Wavelength-Division Multiplexer (MUX) 1214. The illustrated application employs the test system 1100 described with reference to FIG. 11, which comprises an attenuation device 1104 and, in this case, one or more test instruments 1102.

As illustrated in FIG. 12, the attenuation device 1104 may be introduced on optical fiber section 1224 between the transmitter corresponding to the optical channel of the SUT (e.g. channel n in FIG. 12) and the MUX 1214, or on optical fiber section 1226 between the MUX 1214 and the first optical add-drop filter 1218 along the optical communication link 1210.

If introduced on optical fiber section 1226 (i.e. after multiplexing), a partial extinction can be applied to all channels such that, if a suitable attenuation is introduced, the partially-extinguished optical communication SUT suffers from no or negligible NLE-induced deformation. The method 1000 of FIG. 10 may then be employed to estimate the ASE-noise contribution $N_{ASE\_SUT}(\lambda)$ and/or the NLE-induced deformation $k_{NL\_SUT}(\lambda)$ on the SUT at tap 2, tap 3 or any other test point along the optical communication link 1210.

However, in embodiments where the attenuation device 1104 is introduced on optical fiber section 1224 (i.e. before multiplexing), the partial extinction that is only applied to the channel corresponding to the SUT does not typically reduce the NLEs to a condition where their effect on signal deformation can be neglected. Although such embodiments may not allow the characterization of the absolute NLE-induced signal deformation of a SUT obtained, e.g., at tap 2 or tap 3, it may very well be employed to characterize the ASE noise on a SUT obtained, e.g., at tap 1, tap 2 and/or tap 3 by applying steps 1002, 1004, 1006, 1008, and 1012 of the method 1000 of FIG. 10 (step 1010 not applying in this case).

It will be understood that the methods described herein find applications in maintenance, monitoring and/or troubleshooting.

Although the above description refers to portable test instruments (such as portable OSAs), it should be mentioned that some signal characterization methods described herein are particularly useful in the case of monitoring applications which employ fixed (as opposed to portable) test instruments. Referring to FIG. 2, in this case a monitoring instrument, which would include an OSA, should be placed at at least one physical location along the optical communication link, referred to herein as the test point (or receiver end). For instance, a first monitoring instrument could be installed at Tap 1 to provide a source point where acquisitions of, e.g., steps 302 and 304 are performed, and a second monitoring instrument at tap 2, 3, 4 or 5 to provide a test point where acquisitions of, e.g., steps 306, 308 and 316 are performed. Of course, multiple monitoring instruments could be installed along the optical communication link 100, i.e. at tap 1, 2, 3, 4 and 5, thereby allowing characterization of the propagating optical signals at different points along the optical communication link 100. In troubleshooting for example, the evolution of the quality parameters from points to points may then easily allow identification of a problematic segment on the optical communication link 100.

It should be noted that, in this case, all acquisitions are not acquired with the same test instrument and the monitoring instruments may need to either communicate together or with an external computer. In this respect, data exchange between the monitoring instruments or to an external computer may be done through the network under test itself or any other available wireline or wireless network (e.g., 3G, WiMax, 4G/LTE cellular network, etc.). Once the optical spectrum traces are acquired by the monitoring instruments, these may be sent, for instance, to a cloud-based application for processing according to the herein-described characterization methods.

Furthermore, in cases for which all traces are not acquired with the same test instruments, an inter-OSA calibration may be required. In the case of a heterodyne OSA or a Fourier Transform OSA (FFT OSA) for example, the inter-OSA calibration may be limited to an alignment in wavelength of traces acquired at the test point relative to traces acquired at the source point. However, in the case of a monochromator-based OSA, such as a grating-based OSA, it may be required to correct the acquired optical spectrum traces in signal processing to compensate for any difference in the filter function of the OSAs. A calibration may be required to characterize the filter functions or the filter function difference.

It is noted that all the equations provided herein as a function of wavelength, denoted $\lambda$, could be adapted to be expressed as a function of optical frequency (denoted by $\nu$), wave number, or the like. Accordingly, all the equations given herein could be readily adapted to find their equivalent as functions of the frequency or wave number. Similarly, the derivatives of the test trace $P_{SUT}(\lambda)$ and of the reference trace $S_{ref}(\lambda)$, calculated as a function of wavelength in the method 500 of FIG. 5 and in the specific embodiments described herein, could of course be performed as a function of other parameters such as the optical frequency or the wave number.

Also, it should be appreciated that, although the above examples employ optical taps to measure the signal at the respective tap points, the measurement of the spectrally-resolved optical power is not limited to such a "non-invasive" approach and may be undertaken by temporarily disrupting the continuity of the optical path (e.g. via an optical switch, or by physically disconnecting optical connectors). Such an approach may be acceptable for an optical channel not carrying customer traffic (e.g. during commissioning or later maintenance), especially if, for instance, many other DWDM channels are present to minimize the effect of resulting changes in the loading of the optical amplifiers in the network.

Furthermore, some example methods described herein assume a uniform ASE-noise contribution over the optical signal bandwidth in order to estimate the spectral deformation of the signal contribution of the SUT. The ASE-noise contribution is usually not totally uniform, and consequently the presence of some non-uniformity will typically result in an error (i.e. uncertainty) on the estimation of the spectral deformation. The level of acceptable non-uniformity hence depends on the level of acceptable error on the quality parameters to be characterized.

It should be appreciated that the methods described above are not limited to the characterization of an optical signal having a unique signal carrier wavelength. The SUT to be characterized may include a plurality of data-carrying signal contributions multiplexed using Nyquist Wavelength Division Multiplexing (N-WDM) (also referred to as "super-channels" in the scientific literature), such as dual-carrier PM-16-QAM (which is currently deployed for 400 G transmission) or All-Optical Orthogonal Frequency-Division Multiplexing (OFDM), for example, provided that the variation of the signal portion of such an SUT is significantly greater than the ASE-noise variation across at least a portion of the optical signal bandwidth.

The embodiments described above are intended to be exemplary only. The scope of the invention is therefore intended to be limited solely by the appended claims.

What is claimed is:

1. A method for characterizing an optical signal-under-test (SUT) resulting from the propagation of a polarization-multiplexed optical signal on an optical communication link subject to non-linear effects and optical add/drop multiplexing, the SUT comprising at least a data-carrying signal contribution and an Amplified Spontaneous Emission (ASE) noise contribution $N_{ASE\_SUT}$ within an optical signal bandwidth, the method comprising:
at a test point on said optical communication link and at a first time period:
while the polarization-multiplexed optical signal on said optical communication link is live within said optical signal bandwidth, acquiring, using a test instrument, a first commissioning optical spectrum trace $P_{Rx\_t1\_L}(\lambda)$ of said polarization-multiplexed optical signal, said first optical spectrum trace extending over a spectral range encompassing at least a portion of said optical signal bandwidth;
while the polarization-multiplexed optical signal on said optical communication link is extinguished within said optical signal bandwidth, acquiring, using a test instrument, a second commissioning optical spectrum trace $P_{Rx\_t1\_E}(\lambda)$ extending over a spectral range encompassing at least said portion of said optical signal bandwidth;
at said test point on said optical communication link and at a second time period:
acquiring, using a test instrument, a test optical spectrum trace $P_{SUT}(\lambda)$ of said SUT, said test optical spectrum trace extending over a spectral range encompassing at least said portion of said optical signal bandwidth;
using a processing module,
deriving, from said second commissioning optical spectrum trace $P_{Rx\_t1\_E}(\lambda)$, a first ASE-noise level $N_{ASE\_Rx\_t1}(\lambda)$ on said first commissioning optical spectrum trace $P_{Rx\_t1\_L}(\lambda)$;
determining a first spectral shape trace $S_{Rx\_t1}(\lambda)$ of said data-carrying signal contribution of said polarization-multiplexed optical signal at said first time period and at said test point using at least said first commissioning optical spectrum trace $P_{Rx\_t1\_L}(\lambda)$ and said first ASE-noise level $N_{ASE\_Rx\_t1}(\lambda)$ using a relation equivalent to the following equation:

$$S_{Rx\_t1}(\lambda) = P_{Rx\_t1\_L}(\lambda) - N_{ASE\_Rx\_t1}(\lambda);$$

determining, within said spectral range, a relative signal deformation $k(\lambda)$ of the data-carrying signal contribution between said optical signal at said first time period and said SUT at said second time, using a relation equivalent to the following relation:

$$k(\lambda) = \left[ \frac{dP_{SUT}(\lambda)/d\lambda}{dS_{Rx\_t1}(\lambda)/d\lambda} - \frac{1}{2} \frac{d}{d\lambda} \left( \frac{dP_{SUT}(\lambda)/d\lambda}{dS_{Rx\_t1}(\lambda)/d\lambda} \right) \cdot \frac{S_{Rx\_t1}(\lambda)}{dS_{Rx\_t1}(\lambda)/d\lambda} \right];$$

wherein $d(\ )/d\lambda$ denotes the derivative of corresponding function ( ) as function of wavelength $\lambda$, and wherein said relative signal deformation $k(\lambda)$ is representative of a change in signal deformation induced by non-linear effects between said optical signal at said first time period and said SUT at said second time period; and determining, within said spectral range, at least said ASE-noise contribution $N_{ASE\_SUT}$ of said signal-under-test at said second time period using a relation equivalent to the following relation:

$$N_{ASE\_SUT}(\lambda) = P_{SUT}(\lambda) - k(\lambda) \cdot S_{Rx\_t1}(\lambda).$$

2. The method as claimed in claim 1, further comprising:
at a source point upstream from said test point along said optical communication link and at said first time period:
while the polarization-multiplexed optical signal is live on said optical communication link within said optical signal bandwidth, acquiring, using a test instrument, a third commissioning optical spectrum trace $P_{Tx\_t1\_L}(\lambda)$, said third commissioning optical spectrum trace extending over a spectral range encompassing at least said portion of said optical signal bandwidth.

3. The method as claimed in claim 1, further comprising:
using a processing module,
determining a filtering-induced signal deformation $k_F(\lambda)$ on said SUT using a relation equivalent to the following relation:

$$k_F(\lambda) = \frac{(P_{Rx\_t1\_E}(\lambda) - N_{ASE\_res})}{(P_{Rx\_t1\_E}(\lambda_{pk}) - N_{ASE\_res})};$$

wherein $\lambda_{pk}$ denotes a central wavelength of said optical SUT and $N_{ASE\_res}$ denotes the first ASE-noise level $N_{ASE\_Rx\_t1}(\lambda)$ evaluated at a wavelength within said spectral range and spaced from the central wavelength $\lambda_{pk}$.

4. The method as claimed in claim 2, further comprising:
using a processing module,
determining a filtering-induced signal deformation $k_F(\lambda)$ on said SUT using a relation equivalent to the following relation:

$$k_F(\lambda) = \frac{(P_{Rx\_t1\_E}(\lambda) - N_{ASE\_res})}{(P_{Rx\_t1\_E}(\lambda_{pk}) - N_{ASE\_res})};$$

wherein $\lambda_{pk}$ denotes a central wavelength of said optical SUT and $N_{ASE\_res}$ denotes the first ASE-noise level $N_{ASE\_Rx\_t1}(\lambda)$ evaluated at a wavelength within said spectral range and spaced from the central wavelength $\lambda_{pk}$.

5. The method as claimed in claim 4, further comprising:
using a processing module,
determining a second spectral shape trace $S_{Tx\_t1}(\lambda)$ of said data-carrying polarization-multiplexed optical signal at said first time period and at said source point, within said spectral range, using a relation equivalent to the following relation:

$$S_{Tx\_t1}(\lambda) = P_{Tx\_t1\_L}(\lambda) - N_{ASE\_Tx\_t1}(\lambda),$$

wherein $N_{ASE\_Tx\_t1}(\lambda)$ denotes a second ASE-noise level on said third commissioning optical spectrum trace $P_{Tx\_t1\_L}(\lambda)$;
determining a total signal deformation $k_{t1}(\lambda)$ on said data-carrying polarization-multiplexed optical signal between said source point and said test point at said first time period, within said spectral range, by comparing said second spectral shape trace $S_{Tx\_t1}(\lambda)$ with said first spectral shape trace $S_{Rx\_t1}(\lambda)$ using a relation equivalent to the following relation:

$$k_{t1}(\lambda) = \frac{S_{Rx\_t1}(\lambda)}{S_{Tx\_t1}(\lambda)};$$

and
determining an NLE-induced signal deformation $k_{NL\_t1}(\lambda)$ on said data-carrying polarization-multiplexed optical signal between said source point and said test point at said first time period, within said spectral range, by removing the filtering-induced signal deformation $k_F(\lambda)$ from said total signal deformation $k_{t1}(\lambda)$ using a relation equivalent to the following relation:

$$k_{NL\_t1}(\lambda) = \frac{k_{t1}(\lambda)}{k_F(\lambda) \cdot k_0},$$

wherein $k_0$ denotes a gain/loss factor.

6. The method as claimed in claim 5, further comprising:
using a processing module,
determining a spectral deformation $k_{NL\_SUT}(\lambda)$ induced by Non-Linear Effects (NLE) on said SUT between said source point and said test point at said second time period by combining said NLE-induced signal deformation $k_{NL\_t1}(\lambda)$ on said polarization-multiplexed optical signal between said source point and said test point at said first time period, to said relative signal deformation $k(\lambda)$ to obtain said spectral deformation $k_{NL\_SUT}(\lambda)$ induced by Non-Linear Effects (NLE) on said SUT between said source point and said test point at said second time period using a relation equivalent to the following relation:

$$k_{NL\_SUT}(\lambda) = \frac{k_{NL\_t1}(\lambda) \cdot k(\lambda)}{k_0}.$$

7. The method as claimed in claim 6, further comprising:
at a source point upstream from said test point along said optical communication link and at said first time period:
while the polarization-multiplexed optical signal is extinguished on said optical communication link within said optical signal bandwidth, acquiring, using a test instrument, a fourth commissioning optical spectrum trace $P_{Tx\_t1\_E}(\lambda)$, said second ASE-noise level $N_{ASE\_Tx\_t1}(\lambda)$ being obtained from said fourth commissioning optical spectrum trace $P_{Tx\_t1\_E}(\lambda)$, said fourth commissioning optical spectrum trace extending over a spectral range encompassing at least said portion of said optical signal bandwidth.

8. The method as claimed in claim 6, further comprising determining an NLE-induced signal deformation factor characterizing said SUT from said signal deformation $k_{NL\_SUT}(\lambda)$ induced by NLE on said data-carrying signal contribution of said SUT.

9. The method as claimed in claim 6, further comprising determining a NLE-induced signal deformation factor SDF of said SUT at said test point from said spectral deformation $k_{NL\_SUT}(\lambda)$, said determining a NLE-induced signal deformation factor SDF of said SUT comprising calculating SDF=$(<|k_{NL\_SUT}(\lambda) - k_{NL\_SUT}(\lambda_{pk})|>)/k_{NL\_SUT}(\lambda_{pk})$, where brackets $<f(\lambda)>$ signify an average of function $f(\lambda)$ over a given spectral range and the brackets $|f(\lambda)|$ signify an absolute value operation on $f(\lambda)$ and $\lambda_{pk}$ is a central wavelength of the optical SUT.

10. The method as claimed in claim 1, further comprising determining an ASE-only Optical-Signal-to-Noise Ratio ($OSNR_{ASE}$) at least from the discriminated ASE-noise contribution $N_{ASE\_SUT}$ and data-carrying signal contribution $S_{SUT}(\lambda)$ of said SUT, said determining an ASE-only Optical-Signal-to-Noise Ratio ($OSNR_{ASE}$) comprising calculating $$OSNR_{ASE} = 10 \log_{10} \left( \frac{\int_{CBW} S(\lambda) d\lambda}{\frac{C}{NBW} \int_{NBW} N_{ASE\_SUT}(\lambda) d\lambda} \right)$$

wherein $\int_x$ is an integral over range x, CBW is a channel bandwidth, C is a normalized resolution bandwidth and NBW is a bandwidth over which the ASE-noise is to be evaluated.

11. The method as claimed in claim 1, further comprising:
discriminating a variation $\Delta N_{ASE}$ of the ASE-noise contribution between said optical signal at said first time and said signal-under-test at said second time from said relative signal deformation $k(\lambda)$ of the data-carrying signal contribution on said test optical spectrum trace $P_{SUT}(\lambda)$ using said first commissioning optical spectrum trace $P_{Rx\_t1\_L}(\lambda)$.

12. A non-transitory computer readable storage medium having stored thereon computer-readable instructions that, when executed by a computer, cause the computer to perform a method for characterizing an optical signal-under-test (SUT) resulting from the propagation of a polarization-multiplexed optical signal on an optical communication link subject to non-linear effects and optical add/drop multiplexing, the SUT comprising at least a data-carrying signal contribution and an Amplified Spontaneous Emission (ASE) noise contribution $N_{ASE\_SUT}$ within an optical signal bandwidth, the method comprising:

obtaining a first commissioning optical spectrum trace $P_{Rx\_t1\_L}(\lambda)$, acquired using a test instrument at a test point on said optical communication link and at a first time period, wherein said first commissioning optical spectrum trace $P_{Rx\_t1\_L}(\lambda)$ is acquired while the polarization-multiplexed optical signal is live on said optical communication link within said optical signal bandwidth, and extends over a spectral range encompassing at least a portion of said optical signal bandwidth;

obtaining a second commissioning optical spectrum trace $P_{Rx\_t1\_E}(\lambda)$, acquired using a test instrument at said test point on said optical communication link and at a first time period, wherein said second commissioning optical spectrum trace $P_{Rx\_t1\_E}(\lambda)$ is acquired while the polarization-multiplexed optical signal is extinguished on said optical communication link within said optical signal bandwidth and extends over a spectral range encompassing at least a portion of said optical signal bandwidth;

obtaining a test optical spectrum trace $P_{SUT}(\lambda)$ of said SUT acquired using a test instrument at said test point on said optical communication link and at a second time period, wherein said test optical spectrum trace extends over a spectral range encompassing at least a portion of said optical signal bandwidth;

deriving, from said second commissioning optical spectrum trace $P_{Rx\_t1\_E}(\lambda)$, a first ASE-noise level $N_{ASE\_Rx\_t1}(\lambda)$ on said first commissioning optical spectrum trace $P_{Rx\_t1\_L}(\lambda)$, determining a first spectral shape trace $S_{Rx\_t1}(\lambda)$ of said data-carrying signal contribution of said polarization-multiplexed optical signal at said first time period and at said test point using at least said first commissioning optical spectrum trace $P_{Rx\_t1\_L}(\lambda)$ and said first ASE-noise level $N_{ASE\_Rx\_t1}(\lambda)$ using a relation equivalent to the following equation:

$$S_{Rx\_t1}(\lambda) = P_{Rx\_t1\_L}(\lambda) - N_{ASE\_Rx\_t1}(\lambda);$$

determining, within said spectral range, a relative signal deformation $k(\lambda)$ of the data-carrying signal contribution between said optical signal at said first time period and said SUT at said second time, using a relation equivalent to the following relation:

$$k(\lambda) = \left[\frac{dP_{SUT}(\lambda)/d\lambda}{dS_{Rx\_t1}(\lambda)/d\lambda} - \frac{1}{2}\frac{d}{d\lambda}\left(\frac{dP_{SUT}(\lambda)/d\lambda}{dS_{Rx\_t1}(\lambda)/d\lambda}\right) \cdot \frac{S_{Rx\_t1}(\lambda)}{dS_{Rx\_t1}(\lambda)/d\lambda}\right];$$

wherein $d(\ )/d\lambda$ is the derivative of corresponding function $(\ )$ as function of wavelength $\lambda$, and wherein said relative signal deformation $k(\lambda)$ is representative of a change in signal deformation induced by non-linear effects between said optical signal at said first time period and said SUT at said second time period; and determining, within said spectral range, at least said ASE-noise contribution $N_{ASE\_SUT}$ of said SUT at said second time period using a relation equivalent to the following relation:

$$N_{ASE}(\lambda) = P_{SUT}(\lambda) - k(\lambda) \cdot S_{Rx\_t1}(\lambda).$$

13. The non-transitory computer readable storage medium as claimed in claim 12, wherein the method further comprises:

obtaining a third commissioning optical spectrum trace $P_{Tx\_t1\_E}(\lambda)$ acquired using a test instrument at a source point upstream from said test point along said optical communication link and at said first time period, while the polarization-multiplexed optical signal is extinguished on said optical communication link within said optical signal bandwidth, said third commissioning optical spectrum trace extending over a spectral range encompassing at least a portion of said optical signal bandwidth;

obtaining a fourth commissioning optical spectrum trace $P_{Tx\_t1\_L}(\lambda)$ acquired using a test instrument at said source point and at said first time period, while the polarization-multiplexed optical signal is live on said optical communication link within said optical signal bandwidth, said fourth commissioning optical spectrum trace extending over a spectral range encompassing at least a portion of said optical signal bandwidth; and determining a signal deformation $k_{NL\_SUT}(\lambda)$ induced by Non-Linear Effects (NLE) on said SUT between said source point and said test point at said second time period, within said spectral range, using a relation equivalent to the following relation:

$$k_{NL\_SUT}(\lambda) = k(\lambda) \cdot \frac{P_{Rx\_t1\_L}(\lambda) - N_{ASE\_Rx\_t1}(\lambda)}{P_{Tx\_t1\_L}(\lambda) - N_{ASE\_Tx\_t1}(\lambda)} \cdot \frac{(P_{Rx\_t1\_E}(\lambda_{pk})) - N_{ASE\_res})}{(P_{Tx\_t1\_E}(\lambda) - N_{ASE\_res})},$$

wherein $N_{ASE\_Rx\_t1}(\lambda)$ denotes a first ASE-noise level on said first commissioning optical spectrum trace $P_{Rx\_t1\_L}(\lambda)$, $N_{ASE\_Tx\_t1}(\lambda)$ denotes a second ASE-noise level on said fourth commissioning optical spectrum trace $P_{Tx\_t1\_L}(\lambda)$, $\lambda_{pk}$ denotes a central wavelength of said optical SUT, and $N_{ASE\_res}$ denotes the first ASE-noise level $N_{ASE\_Rx\_t1}(\lambda)$ evaluated at a wavelength within said spectral range and spaced from the central wavelength $\lambda_{pk}$.

* * * * *